June 1, 1937. R. P. SIMMONS 2,082,725
SELECTIVE SYSTEM AND APPARATUS
Filed Aug. 14, 1930 9 Sheets-Sheet 1
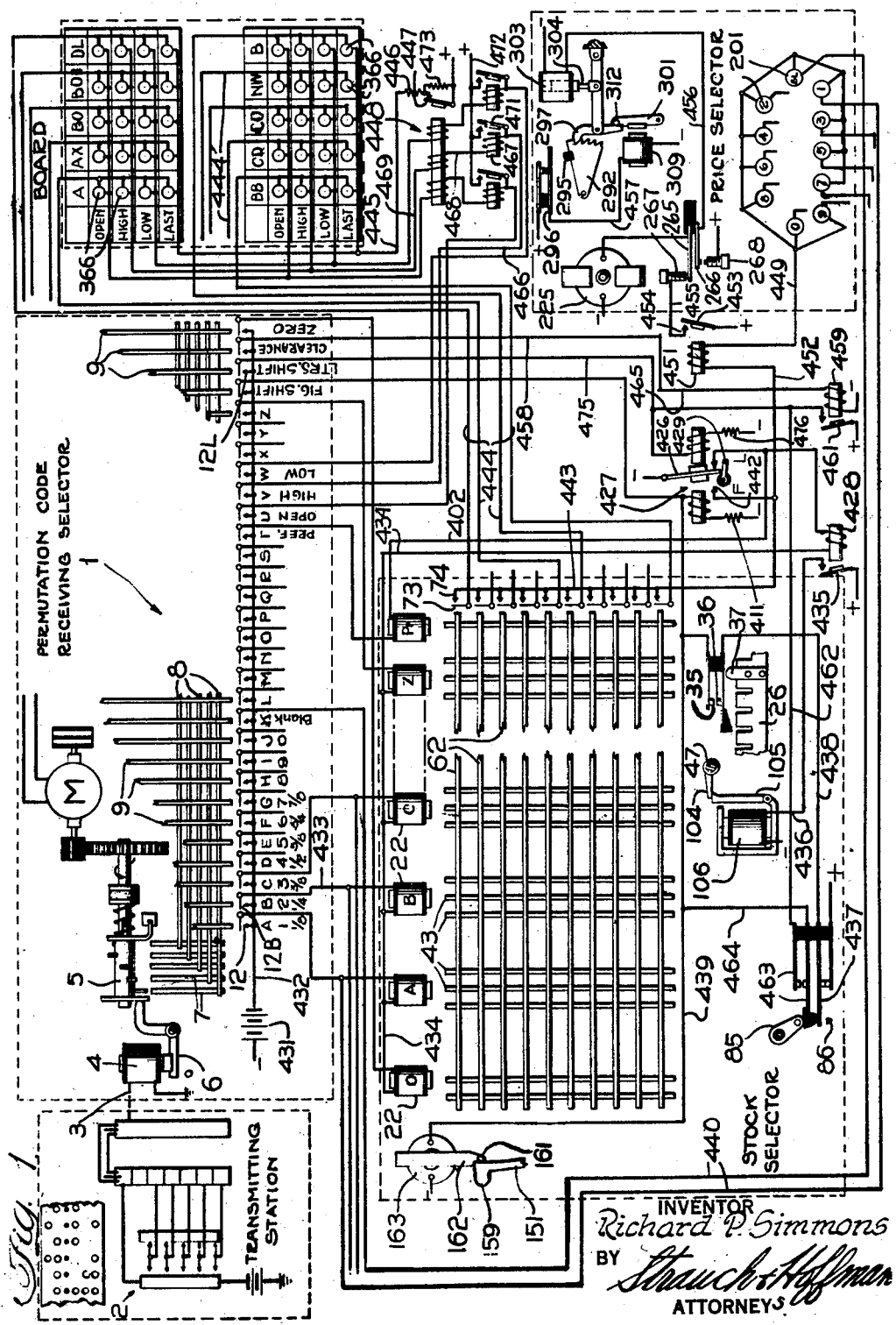
INVENTOR
Richard P. Simmons
BY Strauch & Hoffman
ATTORNEYS

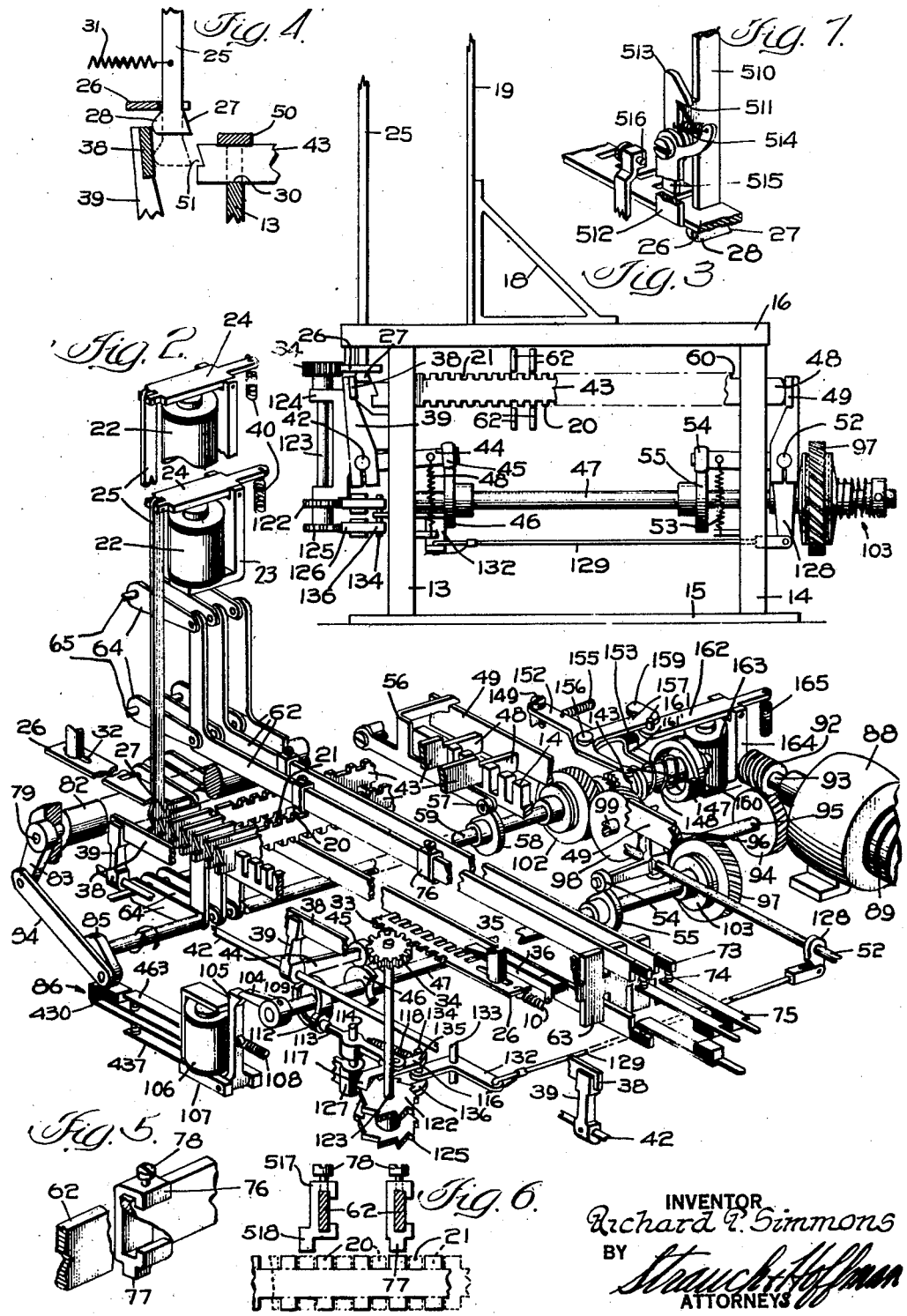

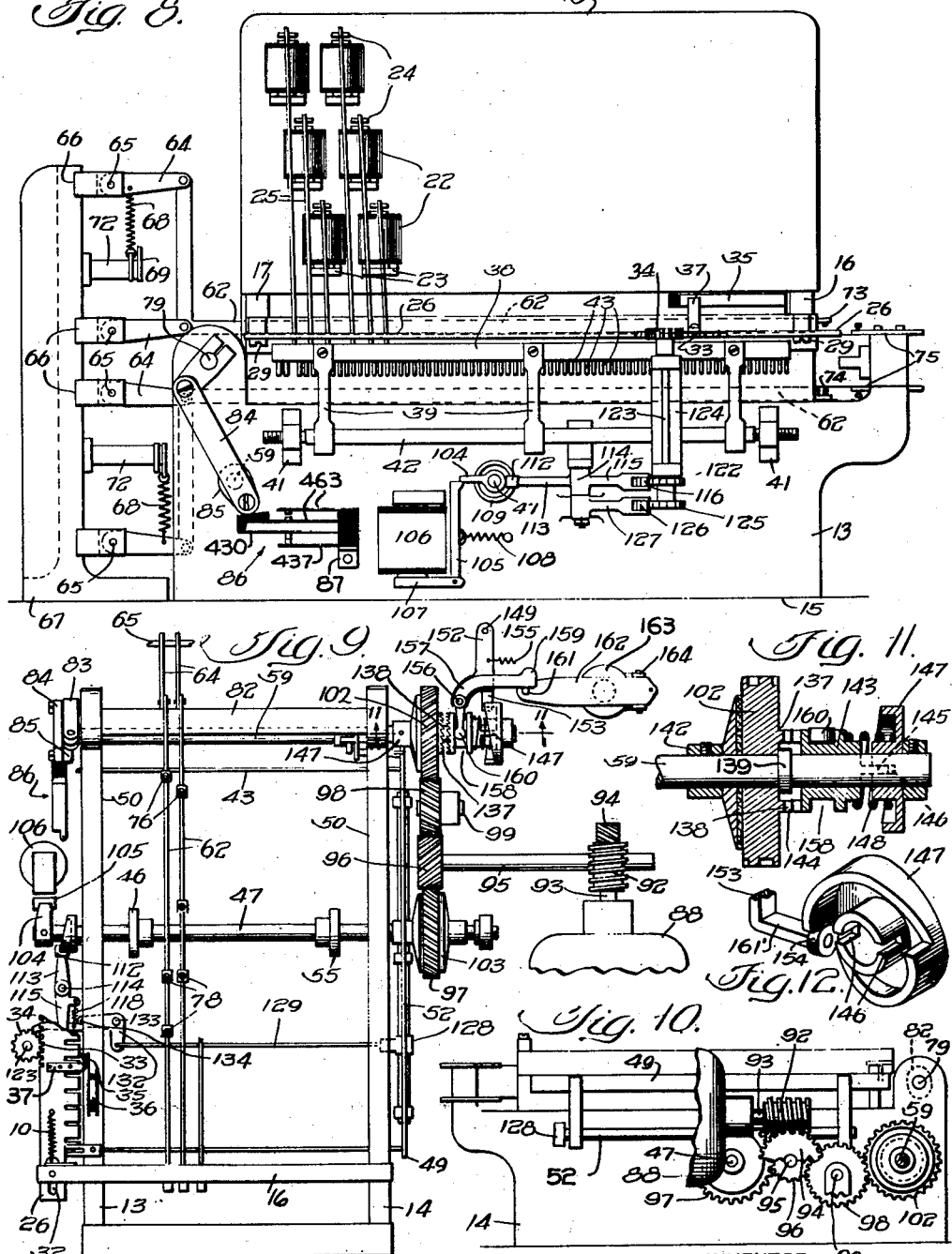

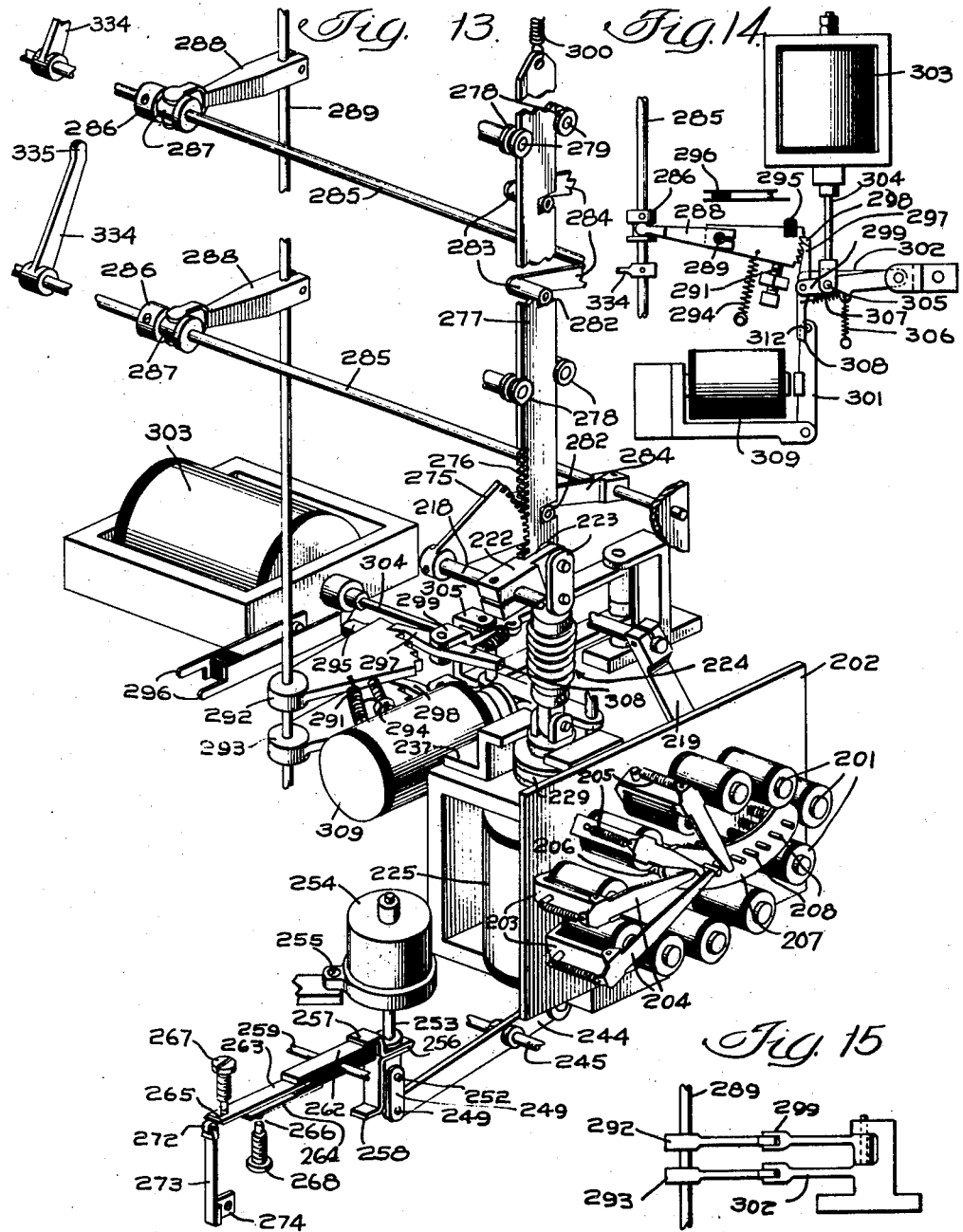

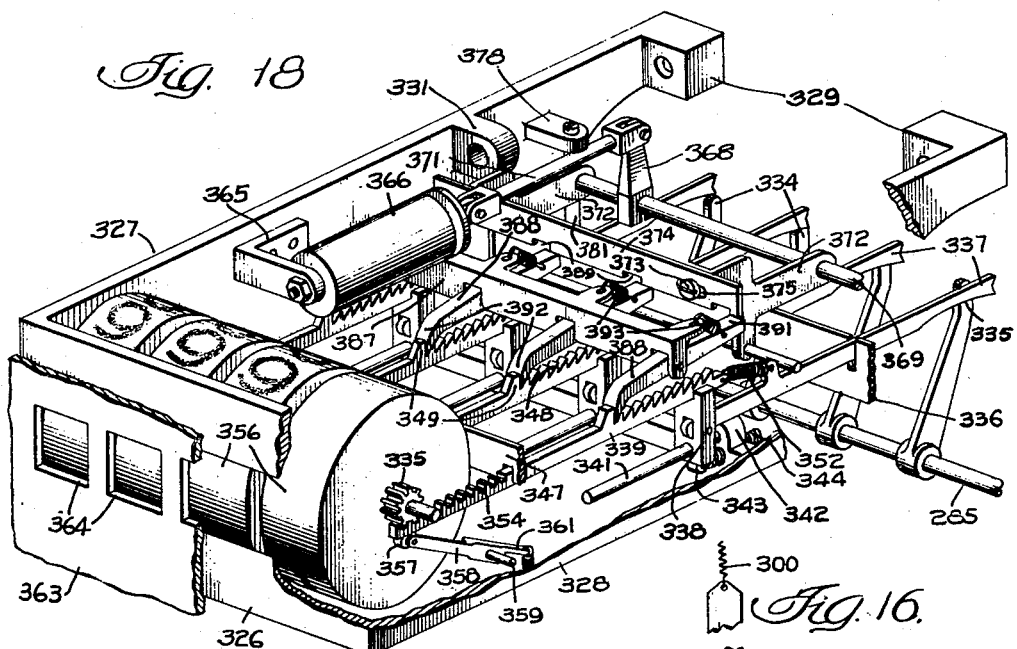
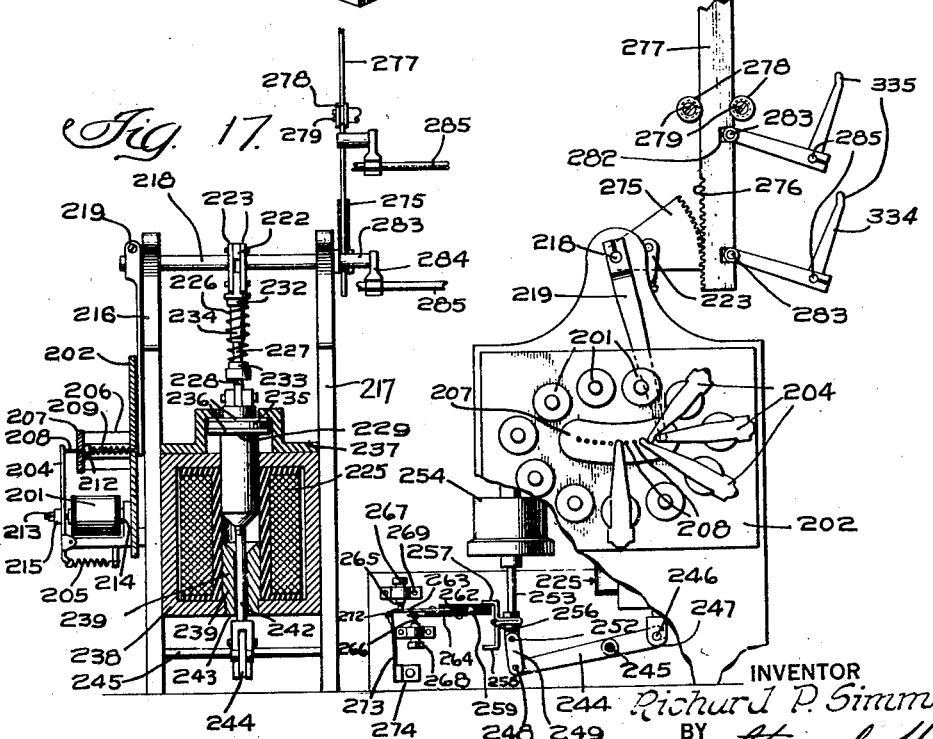

June 1, 1937.   R. P. SIMMONS   2,082,725
SELECTIVE SYSTEM AND APPARATUS
Filed Aug. 14, 1930   9 Sheets-Sheet 6
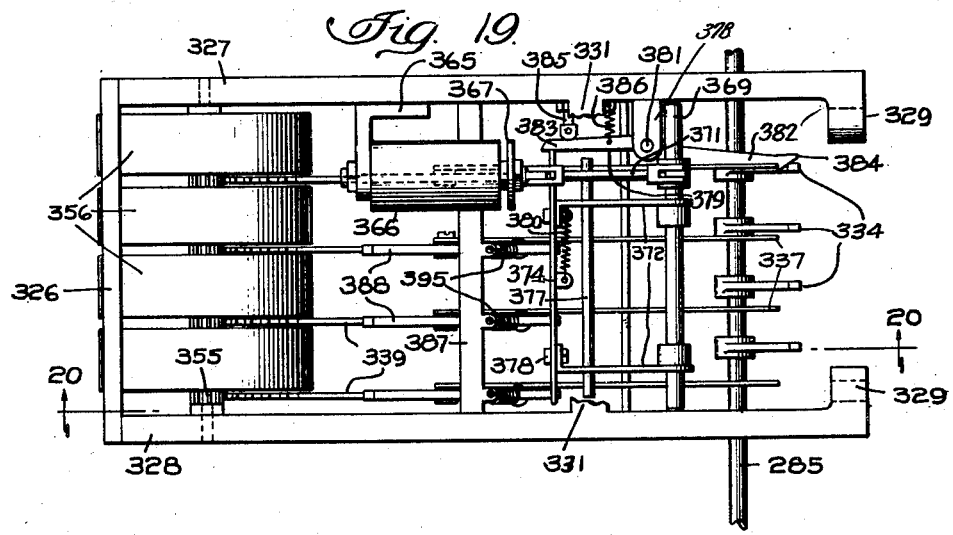
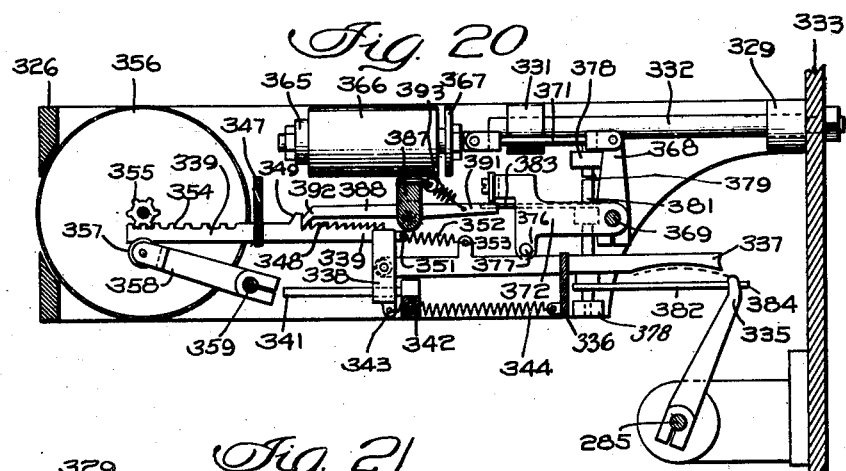
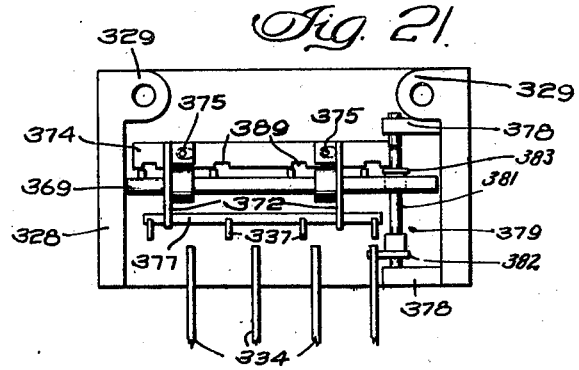
INVENTOR
Richard P. Simmons
BY
Strauch & Hoffman
ATTORNEYS

Fig. 22.

June 1, 1937.  R. P. SIMMONS  2,082,725
SELECTIVE SYSTEM AND APPARATUS
Filed Aug. 14, 1930  9 Sheets-Sheet 8
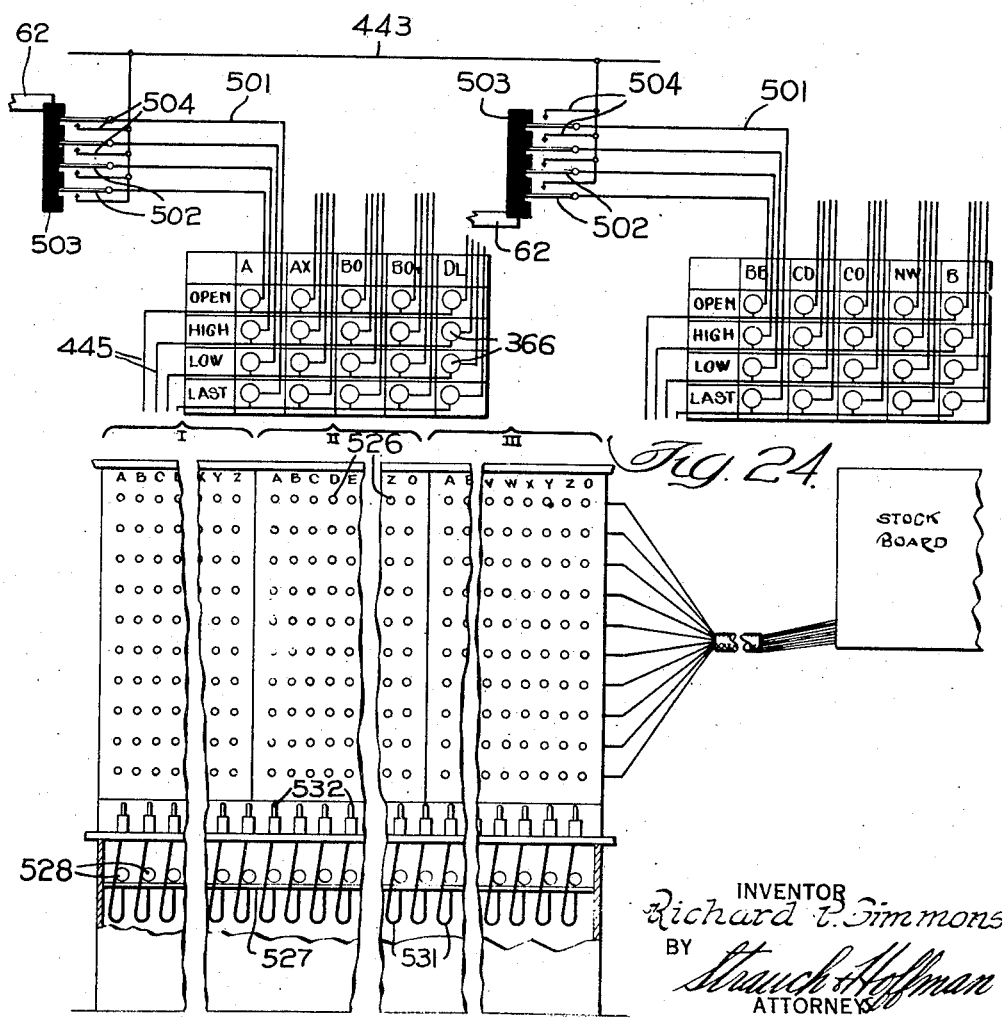

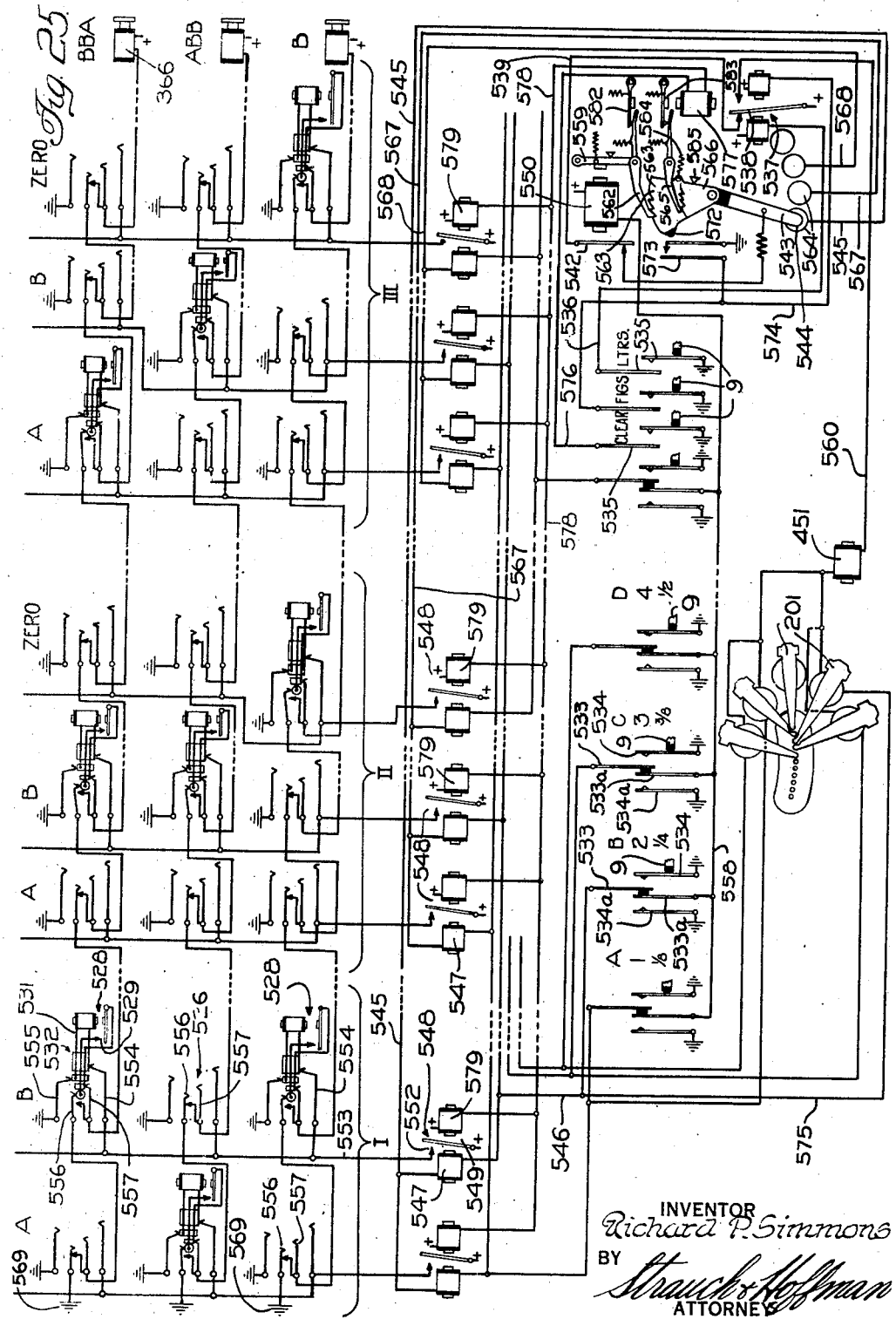

Patented June 1, 1937

2,082,725

UNITED STATES PATENT OFFICE 2,082,725

SELECTIVE SYSTEM AND APPARATUS

Richard P. Simmons, New York, N. Y., assignor to Teletype Corporation, Chicago, Ill., a corporation of Delaware Application August 14, 1930, Serial No. 475,239

16 Claims. (Cl. 177—353)

This invention relates to selective systems and apparatus especially adapted for remote control purposes over telegraphic and like circuits, although applicable to a wide range of other selective control uses.

More particularly, the present invention has reference to systems and apparatus especially adapted for the automatic distribution and display of stock, grain and other commodity quotations, and in its preferred embodiments utilizes permutation signalling codes of electrical conditions for transmitting the desired information to various receiving stations over a single control wire, thus utilizing the basic principles of modern high speed printing telegraphy.

As is well known, systems of buying and selling stocks or commodities have arisen wherein most of the sales thereof are concluded at a central point or exchange, such for example, as the New York Stock Exchange or the Chicago Grain Exchange, while the sales are initiated at many and widespread smaller centers of trading for these same commodities. It is highly desirable in such systems that the various smaller centers be kept in direct and constant touch with the main exchanges in order that the traders may be kept advised of the price fluctuations at the main exchanges.

It is therefore, a general object of this invention to provide systems and apparatus for the high speed automatic posting of information regarding stocks or commodities, such as the price thereof, at a plurality of branch stations or receiving stations over a single channel of communication, such as a telegraph, telephone, or radio channel, my invention in its preferred embodiments, utilizing the permutation signalling codes now well developed in the printing telegraph art.

Still another object of this invention is to provide a system making use of the permutation signalling code, and having embodied therein a receiving device in which an overlap is provided; that is, the received signals may be setting up the previous quotation on the board simultaneous with the reception of a subsequent quotation, so that operation may be continuous and uninterrupted, thus insuring rapidity and speed of operation.

A further object of the present invention is to provide a receiving apparatus for use with a system for stock quotations wherein each commodity, such as stock, has a set of indicators therefor upon which a reasonable range of prices as well as the current quotations are at all times visible, whereby an observer may at a glance see the open, current, high, low and other vital quotations.

Another object of this invention is to provide a market quotation mechanism of the above indicated character with means for automatically changing the various types of information regarding the commodities, the indicating mechanisms being so coordinated that one or more of the vital quotations will be changed when the received signals are of such nature as to require a multiple change on the indicators. For example, in a stock quotation board, wherein each stock has a "high", "low", "opening" and "last" price quotation, when a "high", "low" or "opening" quotation comes in, the "last" indicia is automatically changed by the present invention.

Still another object of this invention is the provision of a market quotation board comprising a large proportion of substantial mechanically operated elements and in which the electrical parts are minimized, thus resulting in a device which is rugged and reliable, with consequent low cost of maintenance.

Another object of the present invention is the provision of novel quotation board mechanism wherein the indicating or displaying unit may be readily re-arranged in order to adapt the board to widely different displays without materially changing the mechanism involved. For example, some of the receiving stations or brokers may have a board adapted to display quotations for two hundred stocks, whereas possibly several thousand stocks may be quoted over the system by the central station. The improved receiver mechanism of the present invention is so arranged that the operator of a small board may readily and simply change his mechanism to receive quotations of any of the stocks being quoted by the central transmitting station.

Still another object of the invention is the provision of a system and apparatus as above described wherein the message may be temporarily lengthened for the reception of special information without altering the receiving devices connected thereto.

A further object of the present invention is the provision of novel transmitting and receiving mechanisms useful independently of the relations hereinafter disclosed in various selective and remote control operations in a manner that will be apparent to those skilled in the art.

This application is an improvement upon my application "Quotation boards", Ser. No. 721,959, filed June 23, 1924.

These and other objects will be apparent from the following description and appended claims when taken in conjunction with the accompanying drawings wherein:

Figure 1 is a diagram of the circuit, including a preferred embodiment of receiving selector in partial detail;

Figure 2 is a perspective representation of the stock selector;

Figure 3 is a right side elevation view of the stock selector of Figure 2;

Figure 4 is a fragmentary detail sectional view of a selecting feeler and a letter bar;

Figure 5 is a perspective detail of a stock bar dog;

Figure 6 is a detail of the "preferred" letter bar and its associated dogs;

Figure 7 is a perspective detail of a latch associated with the "preferred" feeler;

Figure 8 is a front elevation of the stock selector;

Figure 9 is a plan view of the stock selector.

Figure 10 is a rear elevation of the stock selector.

Figure 11 is a sectional detail of the jaw clutch of the stock selector; taken on line 11—11 of Figure 9.

Figure 12 is a perspective detail of the crown cam of Figure 11;

Figure 13 is a perspective representation of the board operating mechanism;

Figure 14 is a partial plan view of the mechanism shown in Figure 13;

Figure 15 is a fragmentary elevation of some of the mechanism of a portion of Figure 13.

Figure 16 is a right side elevation of the mechanism of Figure 13;

Figure 17 is a rear elevation partially in section of the mechanism of Figure 13;

Figure 18 is a perspective of a dial-set;

Figure 19 is a plan view of the mechanism of Figure 18;

Figure 20 is a section on the line 20—20 of Figure 19;

Figure 21 is a rear elevation view of the mechanism of Figure 18;

Figure 22 is a front elevation view of the board;

Figure 23 is a diagram of a circuit for a modified form of part of the circuit of Figure 1;

Figure 24 is a diagrammatic representation of a modified form of this invention, and Figure 25 is a circuit diagram of the modification illustrated in Fig. 24.

This improved system and apparatus for the automatic posting of prices of stocks or other items makes use of the transmitting and receiving apparatus used in the start-stop printing telegraph system. Such devices are well-known and in large commercial use. Systems of this nature operate through the medium of a signalling code usually composed of five units, wherein each character code comprises a start impulse, five code impulses of various permutations of two current conditions, and a stop impulse. With two different electrical conditions, 32, different code combinations or characters are possible, but in printing telegraphy it is customary to use a shift and unshift code to determine the figures and letters respectively, and to provide a shift mechanism, as in a typewriter, in the receiving printer whereby the proper letter or figure will be printed. With the assistance of a shift mechanism a larger number of characters may be printed.

In the present device a letter and figure shift is provided, to determine whether the incoming signals control an item selector or the price indicating units.

If the ordinary printing telegraph receiver, as adapted to the present invention, were used as an item selector only a very small number of such items could be selected because of the mechanical limitations of the receiver. For this reason an additional device, called a stock selector, is introduced, which is merely a translator, responsive to combinations of letters, representing stock symbols. Within the stock selector these letter combinations control a mechanism which makes it possible to select a very large number of items by suitable permutations of letter groups of three letters each. This is accomplished by storing the three received letters, and at a certain instant resolving the setting of these three letters into a switching function which selects the item to be quoted.

Following the stock or item selection the system is automatically switched or shifted to the "figures" selection condition, and the subsequently received price is set up on a set of indicator dials for display upon the quotation board.

This improved device is concerned mainly with the receiving or indicating terminal station, but in order to show the origin of the code permutations of electrical impulses which become effective to operate the board the origination of such signals will be briefly described.

Two well known methods are available for this purpose; direct keyboard propagation, or the use of a perforated tape as a storage medium between the keyboard and the transmitter. A transmitting keyboard for the direct propagation of electrical signals for this purpose is fully disclosed in U. S. Letters Patent #1,595,472 granted August 10, 1926 to H. L. Krum. In lieu of a keyboard transmitter as therein disclosed a tape perforating keyboard of any type well known in the art may be utilized, and the tape produced thereby fed through a tape transmitter also of any well known type. Whatever transmission means may be adopted start-stop code permutations of signalling impulses are propagated over a single line wire to operate a receiving device as disclosed in Letters Patent #1,567,392 granted December 29, 1925, to E. E. Kleinschmidt.

The present invention consists mainly of three parts:

(1) A receiving device which is a modification of the receiver shown and described by E. E. Kleinschmidt in the patent just mentioned.

(2) A stock selector which chooses the particular group of stock unit dial-sets on the board which it is desired to operate to show quotations for that stock.

(3) A stock board with its groups of numeral dial-sets and mechanism to operate the same.

Description of the receiving selector

The receiving device, generally indicated by the reference character 1, will be first described in substance, a more complete description being available in the Patent #1,567,392 referred to. As shown in Fig. 1 the signals originating at tape transmitter 2 are propagated over line wire 3 to actuate receiver magnet 4. Pin barrel 5 is rotated on the start-stop principle and cooperating with armature 6 of receiver magnet 4 sets latches 7 in operative or non-operative position in accordance with the received code combinations of impulses. By means of a bail (not shown) the code bars 8 are moved as determined by latches 7 and become set in code combinations corresponding to the received impulse groups. With the reception of each code group a second bail (not shown) allows one of pull bars 9 to be spring-operated toward the front of the receiver, only one actuating bar 9, individual to a particular code bar setting, being operated for each character received. Up to this point the operation of the receiver is just as described in the patent referred to.

It will be noted that the receiver of Patent #1,567,392 provides an overlap whereby one complete set of signals is set up and operates the selected bar 9 simultaneously with the reception of a succeeding code combination. This is an important feature which is especially utilized in the present invention since the stock selector mechanism about to be described may be operating in response to the first selected bar 9 while a new code combination is being received and stored in the Kleinschmidt receiver for operating a succeeding bar. Although the receiver of Patent #1,567,392 is adapted for use with this invention, it will be understood that any other type of receiver may be used having embodied therein the overlap or momentary storing of signals while the preceding code combination is operating the mechanism.

In order to adapt this receiver to the purpose of this invention there is added a row of pairs of contacts 12 disposed toward the front of the receiver, one pair of said contacts 12 being individual to each pull bar 9 and arranged so that each is closed upon the operation of its individual pull bar 9. Hence it is clear that upon the reception of any code combination of impulses one pair of these contacts will be closed, the purpose of this operation appearing hereinafter.

*Construction of the stock selector*

A description of the stock selector will now be given.

The improved stock selecting device is carried on a built-up framework of horizontal and vertical members, which may, if desired, be incorporated into a casing. As shown in Figs. 3, 8, 9 and 10 there is a front and a rear frame 13 and 14 supported vertically by base plate 15. Spanning front and rear frames 13 and 14 and affixed thereto at the extreme left and right are cross members 16 and 17, one only of which is shown in Figure 3. Affixed to cross members 16 and 17 are two right angled brackets 18 which in turn support in a vertical plane magnet mounting plate 19. Fastened to plate 19 and distributed thereupon in a specific spaced relationship are selecting magnets 22, twenty-seven in number, and which may be referred to for convenience respectively as zero, A, B, C, D, . . . Z. Pivoted upon yoke 23 of each selecting magnet 22 is armature 24, slotted at the end opposite the pivot. Appropriately pivoted within the slotted portion of each armature 24 is a selecting feeler 25, normally disposed in a position slightly inclined from the vertical. Feelers 25 are each of predetermined length to align their lower ends and are guided thereat so as to maintain a definite spacing, by means of slots in comb 26 (see Figs. 4 and 9). The lower extremity of each feeler 25 is provided with a short inclined edge 27 as shown in detail in Fig. 4, and the opposite edge is slightly arcuate as shown at 28, the purpose of which is to allow the feelers to be engaged with their letter bars, as will hereinafter appear more fully.

Comb 26 is slidably mounted upon two shoulder screws 29 carried by the front end of the cross bars 16 and 17, slots 32 in each end of the comb 26 limiting longitudinal movements thereof. A short portion 33 of one edge of comb 26 is provided with rack gear teeth, and a pinion 34 is in engagement therewith, to move comb 26 longitudinally, thus aligning the lower ends of each of the feelers 25, with one of three letter bars associated therewith, as more fully described hereinafter. A spring 10 attached to comb 26 returns it to normal position when released.

The feelers 25 are loosely pivoted to their armatures 24 whereby they may tilt or assume a limited angular position when their lower ends are moved by comb 26.

Supported upon and insulated from front frame member 13 is a pair of contact springs 35 and 36 (Figs. 8 and 9). A contact operating extension 37 attached to comb 26 is in operative relation with an insulating portion of front contact 35, and engages it when comb 26 is in its extreme left position as viewed in Fig. 8.

Adapted to engage simultaneously all of the small arcuate edges 28 of the lower extremities of feelers 25 is universal bail 38 (Figs. 2, 4, and 8), which is a long flat blade suitably supported upon three arms 39 clamped to bail shaft 42, the latter being pivotally carried on brackets 41 affixed to the front frame 13 of the selector. A fourth arm 44 (Fig. 3) also clamped to bail shaft 42 extends horizontally into the selector and carries at its extremity a cam follower roller 45 adapted to be operated by cam 46 affixed to cross shaft 47, tension spring 48 constantly urging arm 44 in a clockwise direction, and thereby maintaining roller 45 in contact with cam 46. Individual tension springs 31, Fig. 4, urge feelers 25 in a direction such as to hold them in contact with bail 38, and other individual tension springs 40 act in a retractile manner upon armatures 24 and consequently maintain feelers 25 in their upward or normal position.

Associated with each feeler 25 (except the one individual to the "zero" magnet) and in operative relation therewith are three letter bars 43, corresponding to the three letters composing the stock symbol portion of the quotation message. In the normal position of the selector, when comb 26 is fully to the right the feelers 25 are in alignment with that letter bar 43 of each group of three which is at the extreme right. The feeler 25 associated with the "zero" magnet is in operative relation with only two letter bars 43, there being a space whereat there would be a right hand bar in all other groups. Consequently there is a total of 78 plus 2, or 80 of the bars 43. These latter are notched on both their upper and lower edges with equally spaced notches 21 all of the same shape providing lugs 20 therebetween, and are suitably guided in and equally spaced with respect to each other in slots 30 cut in the top edge of front and rear frame members 13 and 14, retaining bars 50 screwed to the frame members 13 and 14 acting to keep the bars 43 from departing from their slots. The front extremity of each of the bars 43 is provided with an inclined notch 51 (Fig. 4) corresponding in shape to the inclined portion 27 on the extremity of the feelers 25. A shoulder portion 60 is provided near the rear end of each letter bar 43 which serves as a backstop. The rear extremity of each bar 43 is provided with an arcuate end 48 and a reset bail or blade 49 is adapted to engage the ends 48 of all bars 43. Blade 49 is carried by a reset bail shaft 52 having an arm carrying cam follower roller 54 and a tension spring 53 is provided to hold cam follower roller 54 in engagement with its operating cam 55 exactly as for the other bail 38, this second cam also being fixed to cross shaft 47.

A latch arm, 56, Fig. 2, pivotally carried on rear frame member 14 is held in latching engagement with the blade 49 by a tension spring (not shown) when blade 49 is back in its unoperated position. Latch arm 56 bears cam follower roller 57 in operative relation with bail release cam 58 fixed to shaft 59.

Located transversely with respect to letter bars 43 is a plurality of stock code bars 62. These latter are disposed in edgewise vertical position above and below selector bars 43. As many stock bars 62 are supplied as there are stocks on the board with which the selector is used, although in practice the stock selector would be built in standard sizes containing fixed groups, say 100, 200, 300, etc., stock bars 62. As is obvious from the figures, stock bars 62 are disposed above and below letter bars 43 in order to minimize the width of the selector unit, and correspondingly letter bars 43 have both their upper and lower edges notched in duplicate. Slotted combs 63 affixed to cross members 16 and 17 serve to maintain stock bars 62 in spaced relation.

Referring to Figs. 2 and 8 it will be seen that the stock bars 62 are formed in their flatwise plane substantially into L-shape, the vertical legs of the upper bars extending upwardly and those of the lower bars extending downwardly. Pivotally connected at the bend of the L and also at the outer extremity of the short leg are duplicate links 64 which are also thin and flat and pivotally supported at their other end upon rods 65, affixed in brackets 66 carried by the frame member 67 supported on the base plate 15. Collars (not shown) are provided to maintain the fixed spacing of the links 64. Links 64 connected to the extremity of the short legs are urged downward and upward for the upper and lower stock bars 62 respectively, by tension springs 68, one individual to each stock bar 62, the opposite end of each spring 68 being attached to spring plates 69 supported on brackets 72 carried on the frame member 67. Thus it is obvious that by the link suspension just described the stock bars 62 are moved parallelogrammatically.

Stock bars 62 are provided at their right end with contacts 73 one individual to each bar, and insulated therefrom for controlling a selected magnet, one for each stock bar. These contacts 73 are arranged to move into abutting engagement with related individual contacts 74 carried on contact springs 75 insulated from and suitably mounted on cross bar 13, Fig. 8. In addition each stock bar 62 is provided with three adjustable dogs 76 slidable thereon, see detail view Fig. 5, which consist essentially of a suitable guiding body portion provided on the under side with integral lug 77. A screw 78 serves to clamp each dog in its set position. As will later appear these three dogs 76 are adjusted to different positions for each particular stock bar 62 so that upon operation of a particular group of three letter bars 43 the stock bar 62, having its dogs 76 set to correspond to those three operated letter bars 43, will be allowed to close its associated contacts 73 and 74.

Journaled in the front and rear frames 13 and 14 above shaft 59 (Fig. 10) is shaft 79 which carries resetting bail 82 of uniform elliptical cross-section integral therewith, disposed between the upper and lower sets of stock bars 62 (Fig. 2). In its normal position the major radius of bail 82 is vertical, thereby spreading the stock selecting bars 62 outwardly against the tension of springs 68. Affixed to the front end of the bail shaft 79 is the crank arm 83, to the outer end of which is pivoted the connecting link 84. The latter is pivoted at its other end to crank arm 85 affixed to the front end of shaft 59 and adapted, during the rotation thereof, to oscillate cam shaft 79 from its effective to its noneffective position.

Arranged to be operated by the end of crank arm 85 is an electric switch 86 (Figs. 2 and 8) supported on bracket 87 on the front frame 13.

Now, referring to Figure 2, the stock selector is driven by motor 88, speed governed and regulated by governor 89 of a type familiar in the art. Worm 92 affixed to motor shaft 93 is in mesh with worm gear 94 affixed to shaft 95 suitably journaled in bearings in the selector frame. Shaft 95 (Figs. 9 and 10) is also provided with gear 96 affixed thereto which is directly in mesh with gear 97 frictionally carried upon main shaft 47. Through the medium of idler gear 98 suitably carried on a stub shaft 99, gear 96 is also in driving relation with clutch gear 102 frictionally carried upon shaft 59.

Gear 97 may drive its associated shaft 47, when the latter is released for rotation, through felt disc friction clutch 103 of a common type. Shaft 47 is provided at its front end with a stop arm 104 (Figs. 2, 8, and 9) in abutting engagement with shaft release armature 105 operated by release magnet 106, suitably mounted upon front frame 13. Armature 105 is pivoted to magnet yoke 107 and is held in operative engagement with stop arm 104 when magnet 106 is deenergized, by retractile spring 108.

In addition to the two bail cams 46 and 55 hereinbefore mentioned there is affixed to shaft 47 a crown cam 109 (Figs. 2, 8, and 9), to operate the feed of comb 26 and the movement of feelers 25 engaged therewith. Cam 109 is in operative relation with follower roller 112 carried on one arm of rocker lever 113 pivoted to front frame 13 at 114, a tension spring (not shown) attached to rocker lever 113 and to frame 13 urging roller 112 into engagement with cam 109. Pivotally supported at the extremity of right hand arm 115 of rocker lever 113 is feed pawl 116, (Fig. 8) provided with ratchet feeding tooth 117 at its forward end and a straight extension 135 for its opposite end. Tension spring 118 (Fig. 9) extending between extension 135 and rocker lever 113 tends to urge feed pawl 116 into engagement with the teeth of its associated ratchet wheel 122. Ratchet wheel 122 is affixed to the lower end of short vertical shaft 123 suitably journaled in bearing bracket 124 (Fig. 3) carried upon the front frame 13. Below ratchet wheel 122 and sleeved with it to shaft 123 is second ratchet wheel 125 acting as a detent wheel. Detent pawl 126 of shape similar to feed pawl 116 is pivotally supported on fixed arm 127 and is urged into engagement with its associated detent wheel 125 by a spring similar to 118 and has an extension 136 whereby it may be released. At the upper end of shaft 123 is fixed pinion 34, previously mentioned, whereby oscillations of lever 113 by crown cam 109 will cause rotation of shaft 123 to thus move comb 26 longitudinally.

Now returning to bail shaft 52 (Figs. 2 and 9)

it will be noted that another arm 128 is clamped thereto, and by means of connecting link 129 is arranged to rock bell crank lever 132 pivoted to framework at 133. Bell crank 132 carries vertical fixed pin 134 disposed in operative relationship with extensions 135 and 136 of feed pawl 116 and detent pawl 126 respectively to release them.

Referring to Figs. 9 and 11 it will be seen that gear 102 is provided with flange 137 formed on one side thereof, and that this flange is provided with sawlike clutch teeth 138 cut on the rim thereof. Shoulder 139 on shaft 59 and collar 142 affixed thereto restrain gear 102 from axial movement but permit it to revolve freely. Adjacent gear 102 is clutch sleeve 143 slidable upon shaft 59 and provided upon one end with clutch teeth 144 of proper form to engage teeth 138 upon gear 102. The other end of sleeve 143 is provided with two tongues 145 engaging corresponding slots 146 cut in the hub of crown cam 147 (Fig. 12) the latter being fixed to shaft 59 by any convenient means. A coiled compression spring 148 is continually urging sleeve 143 away from cam 147 and toward gear 102, tending to engage clutch teeth 138 and 144.

Pivotally mounted upon stud 149 (Fig. 9) fixed in base plate 15 is lever 152 having a frontward extension. The right extremity 153 of lever 152 is provided with a downwardly offset portion 161' (Fig. 12) carrying follower roller 154 pivoted thereto, the latter being held in operative engagement with cam 147 by means of tension spring 155 attached to lever 152 and to the framework. The frontward extension of lever 152 (Fig. 2) carries bell crank lever 157 pivoted thereto at 156. This member is provided with a rightward extension terminating in a circular head 160 which slidably engages groove 158 in clutch sleeve 143, the other extremity of bell crank 157 terminating in an ear-shaped portion 159. The straight edge of bell crank 157 opposite ear 159 normally engages the side of pin 161 carried by armature 162 of clutch release magnet 163, affixed to selector base 15. Armature 162 is pivoted upon yoke 164 and is provided with retractile spring 165.

*Operation of stock selector*

Having set forth the construction of the stock selector, a detailed description of the operation of the mechanical parts thereof will now be given.

As hereinafter pointed out in more detail, it is necessary to send a "letters shift" or a "clearance" signal between quotations, to insure unison of the various stations and to synchronize the operation thereof just as at present the dispatching office transmits throughout the day to the common step-by-step stock tickers, several synchronizing impulses of a definite kind. Hence, to synchronize all stations, transmission is initiated by a "letters shift" signal, such signal closing its associated contact pair 12L (Fig. 1). Thereupon a circuit is completed from positive of battery 431, over common conductor 432, closed pair of contacts 12L, conductor 475, right coil of double coil relay 427, resistor 476, to negative of battery.

Closing of the letter shift contact 12L will thus at once energize the right coil of relay 427 to shift the tongue 426 to the right. An alternative circuit branching from line 475 continues over line 462, thence through the contacts 463 which are open at this time, (shaft 59 being at rest) over lines 464 and 439, through the winding of left coil of relay 427, through the resistance 411 to negative. When contacts 463 are closed upon the release of shaft 59 and after the selection of a stock, the above mentioned alternative circuit is completed, causing the energization of left coil of relay 427 and the consequent shifting of contact armature 426 from its "letters" to its "figures" position.

The circuit being thus arranged, the first letter of the stock to be quoted is transmitted, it being remembered that each stock is designated by three letters hence three sets of signal impulses must be sent for each stock. In some instances the stock may be designated by only one or two letters, whence the difference in blank signals must be transmitted since the stock selector operates after reception of three code signals. The reception of the first letter of the stock to be quoted energizes one of the selecting magnets 22, for example, the magnet "B" shown in Figure 1.

Current then flows from positive of battery 431, over common conductor 432, contact pair 12B, conductor 433, through selector magnet B in the stock selector, said magnet B being one of the series of selecting magnets 22 of Figs. 2 and 8. Current then passes over common conductor 434 to operate both magnet B and relay 428 since negative has already been applied to magnet 428 by engagement of armature 426 with the "L" contact by operation of the "letters shift" signal, to thus complete the circuit.

The feeler 25, Fig. 2, associated with selector magnet B is thereupon operated downward upon the attraction of its armature 24, and simultaneously tongue 435 of relay 428 closes a circuit from positive, over conductor 436, coil of shaft release magnet 106 to negative. As previously explained, feeler 25 is normally in operative relation with the first of its three letter bars 43. Now, when armature 105 of release magnet 106 is attracted it releases stop arm 104, and shaft 47 being driven through friction clutch 103, begins to rotate. Directly after the beginning of this rotation cam 46 acts upon roller 45 and arm 44 fixed on bail shaft 42 allowing bail 38 in response to spring 48 to carry feeler 25 into operative engagement with its associated first letter bar 43, Fig. 4. Inclined mating portions 27 and 51 serve to lock their appurtenant members together until the conclusion of this selecting function, notwithstanding that retractile spring 40 of the armature 24 is tending to return the feeler 25 to its upward or initial position. Engaged letter bar 43 is pushed toward the rear of the selector against the fixed stop provided by engagement of shoulder portion 60 of letter bar 43 with rear frame member 14. Simultaneously or slightly earlier the other universal bail 49 is operated in a clockwise sense, as viewed in Fig. 3 by roller 54 riding up on high portion of cam 65, and is latched in that position by the latch 56, clear of the rear ends of letter bars 43.

When shaft 47 rotates, crown cam 109 carried thereon operates comb propelling rocker 113 in a counterclockwise sense, as viewed in Fig. 9, and upon the completion of the revolution the drop in crown cam 109 returns rocker 113 to its normal position. This single oscillation of the rocker 113 is effective through feed pawl 116 to rotate vertical shaft 123 the equivalent of one tooth space, thereby rotating pinion 34 and through its meshing rack portion acting to shift comb 26 to the left a step equal to the center to center distance between selector bars 43.

After the shaft 47 has completed one revolution the stop arm 104 re-engages the armature 105, solenoid 106 having been de-energized by opening of contacts 12 and shaft 47 is stopped until again released. The apparatus is now in condition to receive the second letter or equivalent of the stock symbol, the operated letter bar 43 remaining in its position to the right of Fig. 2.

The operated feeler 25 has now returned to normal under action of spring 40 of its armature, the magnet 22 being de-energized by the opening of contact pair 12B and bail blade 38 having disengaged feeler 25 due to cam 46 having raised roller 45 to rotate bail shaft 42.

As recited previously three letters or equivalent must be sent for each stock selection, and a stock symbol "B" is transmitted as "B, zero, zero" in order that the three letter bars 43 necessary to be set for a stock selection may be positioned, as will appear later.

So the first substitute "zero" is next transmitted and received exactly the same way as for "B", and the "zero" feeler 25 is operated to set the right hand "zero" letter bar 43, (the "zero" feeler, it will be recalled, having only two letter bars 43 associated therewith). As set forth previously, movement of comb 26 to the left has oscillated feelers 25 about their pivotal connections to present feelers 25 to their associated middle or second letter bars 43, it being remembered that each feeler 25 (except that operated by the "zero" magnet) has three letter bars related thereto. The reason for only two letter bars in connection with the "zero" magnet now becomes apparent, for it is never necessary to send "zero" as a substitute for the first letter of a stock symbol, only for the second or third letter. Upon the completion of the revolution of main shaft 47, comb 26 is stepped once more a space equal to the distance between the letter bars 43. It is clear that the operation of any one of the stock selector magnets 22 always releases shaft 47 by reason of the fact that shaft release magnet 106 is energized by relay 428 connected in common return wire 434 of all selector magnets 22.

Similarly, the second substitute "zero" is transmitted and becomes effective to set the left "zero" letter bar in operated position, and comb 26 is again advanced one space. However, this last step of comb 26 causes the extension 37 to close its associated contacts 35 and 36, and current will flow from positive over the lower or normally closed pair 437 of timing contacts 36, conductor 438, closed contacts 35 and 36, conductor 439, clutch trip magnet 163, to negative, energizing magnet 163. Upon energization of magnet 163 its armature 162 is attracted withdrawing pin 161 from blocking engagement with arm of bell crank lever 157, Fig. 2. Compression spring 148 thereupon becomes effective to slide sleeve 143 upon its shaft 59, Fig. 11, engaging its clutch teeth 144 with those 138 on driving gear 102, bell crank 157 turning about its pivotal connection 156 upon arm 152. Consequently gear 102 now drives through sleeve 143, crown cam 147 to which it is splined; and also shaft 59 to which cam 147 is affixed.

Cam 147 is so shaped that it rocks its follower 152 in a clockwise sense, as viewed in Fig. 9, about its pivot 149. This motion is communicated to bell crank 157, and that member being free at its extreme ear-shaped end 159 now rocks in a counter-clockwise sense about its head 160 as a fulcrum. Ear 159 has meanwhile maintained a position such, that upon de-energization of magnet 163 pin 161 has risen due to the armature's retractile spring and is now prevented from further upward motion by engagement with the lower surface of ear 159. Upon further rotation of cam 147 lever 152 rotates further in its counter-clockwise direction and ear 159 is moved clear of pin 161 which may now complete its upward travel and is again ready to block arm 151. Following this and when shaft 59 has completed one-half a revolution, a drop-off portion of the cam allows member 152 urged by spring 155, to return to its normal position. This motion of member 152 causes bell crank 157 to swing now in a counter-clockwise sense about pin 149 as a fulcrum, thereby swinging head 160 in the same direction to disengage clutch teeth 138 and 144. It will be understood that spring 155 is of strength sufficient to overcome spring 148. Cam 147 is double-acting, that is, it consists of two similar cam halves, see Fig. 12, the purpose of which is to allow shaft 59 to make one-half revolution and then be stopped as explained in detail hereinafter.

Shaft 59 in revolving through one-half a revolution acts through connecting link 84 to rock elliptical bail 82 one-quarter of a revolution, the minor radius of the ellipse replacing the major radius. This permits all stock bars 62 to be presented to letter bars 43, springs 68 urging said stock bars 62 in their respective upward and downward directions. The three operated letter bars "B, zero and zero" which were operated in the example above given, have each presented one of the notches in their respective edges to a dog 76 opposite a particular stock bar 62. If a stock bar 62 has its three dogs 76 set to correspond with the notches of the three operated letter bars 43, that particular stock bar will move farther than the others in their movement toward the letter bars 43, the lugs 77 of the dogs entering their corresponding notches. All other stock bars will find a lug 20 between the notches 21 blocking the downward or upward travel of dog lug 77 and hence these remaining stock bars 62 cannot move into full operated position as the selected stock bar 62 has done. Since there are twenty-six sets of three letter bars 43, and one set of two letter bars 43, the total possible number of different stocks which may be selected on a device of this kind is 26×27×27=18,954.

After a stock has been selected, link 85 on shaft 59 holds contacts 430 and 437 closed and contacts 463 open, while simultaneously with the energization of the clutch magnet 163 a circuit is closed from positive, contact springs 430 and 437, over conductor 438, closed contacts 35 and 36, conductor 439, left coil of relay 427, current limiting resistor 411, to negative, to operate tongue 426 to the left or "figure shift" position. Thus it is seen that after the reception and setting up of the three stock symbol letters, the shift relay automatically operates to prepare the system for the reception of figures as will soon appear herein.

As described before, the advent of the third position of comb 26 presents extension 37 against contact blade 36 which thereupon closes with its associated contact 35 to complete an energizing circuit for clutch trip magnet 163. Shaft 59 then completes another half revolution during which arm 85, having been resting on the insulated portion of blade 430, recedes therefrom allowing the latter to break its engagement with blade 437 opening the last described circuit and establishing engagement between contacts 463. While this circuit is closed, however, and before contacts 430 and 437 are parted, the left winding of relay 427 is also energized as described, causing tongue 426 to engage its figures contact 442.

Upon the movement of the single selected stock bar 62 into its full operated position the contacts 73 and 74 engage (it being remembered that each stock bar has individual contacts 73 and 74) and a circuit is closed from negative, tongue 426 of relay 427, left contact 442, conductor 443, closed pair of stock contacts 73 and 74, one of conductors 444, coil of the selected solenoid 366 individual to the "last" set of numeral dials for the stock B, over common return wire 445, balancing resistor 446, contact and tongue 447 of unoperated relay 448 to positive, to operate the "last" solenoid 366 just mentioned.

By the operation of the mechanism as above described, it will be seen that one stock code bar is selectively operated by the selection of three letter code signals corresponding to the particular stock, in the example above given, said code signals corresponding to B-zero-zero. If the stock to be quoted is designated by the characters USS it will be understood that the magnets 22 corresponding to these letters will be operated in sequence to select the stock bar corresponding to this stock.

From the mechanism as described it will be apparent that the letter bars are selected in sequence and remain in proper position until three such bars have been operated, and then the stock bar corresponding thereto is operated to close its contacts 73 and 74. The circuit energized by contacts 73 and 74 serves to selectively operate the stock board dial in a manner described hereinafter in detail.

In the example, as above given, the stock selector has been described as selecting the stock for operation on the dial board to be later described. From an inspection of Figure 1, it will be seen that some of the contact pairs 12 have associated therewith numbers from one to zero and blank and also fractions. The code bars 9 corresponding to the quotation to be made are next operated to close their contacts 12 to operate a price indicating mechanism hereinafter described in detail. This price quotation operates the dials of the selected stock.

It will be recalled that the stock selector has been stopped after the shaft 59 made one-half revolution. After the figures for the quotation have been transmitted and recorded on the dials in a manner hereinafter described in detail, a clearance signal is transmitted over the line which closes its related contacts 12 in the receiving selector to complete a circuit from positive of battery 431, conductor 432, closed "clearance" contacts 12, conductor 458, coil of relay 459 to negative to operate tongue 461, whereupon a circuit is completed from positive, over tongue 461 and its front contact, over conductor 462, the now closed upper pair of contacts 463, conductors 464, and 439, clutch magnet 103 to trip shaft 59, which rotates through its other half revolution in a manner similar to that described hereinbefore, thereby rocking elliptical bail 82 through 90° to its initial position which by so doing withdraws all stock bars 62 to their initial position, simultaneously opening any closed pair of contacts 73 and 74. Cam 58 on the shaft 59 then becomes effective to raise latch 56, and urged by its spring 53, (see Fig. 3) the bail 49 pushes the three operated selector bars 43 to the front into their initial position. At the same time the bail shaft 52 communicates its motion to the bell crank 132 through the link 129 and the pin 134 lifts the pawls 116 and 126 out of engagement with their respective ratchet wheels 122 and 125, and vertical shaft 123 being free, spring 10 attached to comb 26 can return the latter to its initial or right hand position.

Thus it will be seen that a clearance signal immediately restores the selector to initial position for subsequent operation.

Construction of board control mechanism

Referring to Figs. 13 to 17, there is shown a group of eleven numeral selecting magnets 201 which may be known as 1, 2, 3, 4, . . . 0 and "blank", mounted on a common base plate 202. To yokes 203 are pivoted armatures 204 each being provided with retractile spring 205. Magnets 201 are grouped in a somewhat oval configuration and armatures 204 are each formed to a shape such that their inner extremities lie on an arcuate line, as shown.

Mounted upon studs 206 in front of the plate 202 is the guide plate 207 (Figs. 13 and 17), while guided in holes in plates 202 and 207 are eleven plunger pins 208, one individual to each armature 204. Individual compression springs 209 encircling each pin serve to urge pins 208 outwardly, and a shoulder 212 on each acts as a stop. In normal position the outward end of each pin 208 is in contact with its individual armature, and the inner end is flush with the inner surface of plate 202. A stud 213 on each magnet core 214 and an adjusting nut 215 serve to maintain armature 204 and pins 208 in proper operative relation.

Plate 202 is mounted upon side frame 216 of the stock board control unit (Fig. 17). Suitably journaled at the top of the side frames 216 and 217 is shaft 218. Clamped thereon at the outer end is index arm 219, its lower extremity arranged to move in an arcuate path freely past plunger pins 208 when these are unoperated, but to be stopped in its arcuate motion by any one of pins 208 which is operated by its magnet 201, as will hereinafter appear. Also clamped to shaft 218 is arm 222 pivotally connected by links 223 to plunger extension 224 of solenoid 225, mounted between side frames 216 and 217. Plunger extension 224 is a combination of an outer sleeve 226 (Fig. 17) and a buffer member 227 slidable within sleeve 226. Sleeve 226 is pivoted, as just mentioned, to links 223 and slidable member 227 is provided with ear 228 pivoted to solenoid plunger proper 229. Cylindrical portions 232 and 233 are provided with threaded portions, the grooves formed thereby acting to hold, by threaded engagement, coiled compression spring 234 interposed between said sleeve 226 and buffer 227. The arrangement just described acts as follows: Upon energization of solenoid 225, plunger 229 is moved rapidly downward, thereby stretching spring 234, but an instant later this spring 234 tends to recover its normal length. By so doing it moves attached sleeve 226 downward until shaft 218 to which extension 224 is linked is stopped by means to be later set forth. The whole purpose of the extension 224 is clearly to transform the instantaneous action of the solenoid into a slower cushioned movement resulting in absence of shock and noise.

Secured to a flanged portion 235, Fig. 17, of plunger 229 are leather washers 236. Two rigid stop members 237 limit the upward stroke of plunger 229, and yoke 238 of the solenoid limits the downward stroke, the shock and noise being further minimized by leather washers 236.

The solenoid contains within its coil center return pole piece 239. Downward extension 242 of plunger 229 passing through hole 243 in yoke 238 is connected at its lower extremity to rocker lever 244 pivoted on shaft 245 carried in side frames 216 and 217, and pin 246 (Fig. 16) co-acting with bifurcated end 247 of plunger extension 242 through elongated hole therein allows plunger extension 242 to operate its associated rocker 244 without binding. The opposite end of rocker 244 is pivotally connected at 248 to links 249 which in turn are pivoted at 252 to dashpot plunger rod 253. Dashpot 254 is supported in framework at 255 and is of a common construction, consisting of a piston fitted into the dashpot cylinder, and appropriate valve ports through which the cushioning medium, as air, is expelled and admitted, the function of the dashpot 254 being to regulate the duration of operation of solenoid 225.

Attached by means of a nut to dashpot plunger rod 253 is contact operating member 256, which, as shown, has two forwardly bent lugs 257 and 258. Pivoted to side frame 217 at 259 is contact finger member 262. Fitted to member 262 is the stiff contact finger 263 and yielding contact finger 264, the former carrying contact 265 and the latter contact 266 arranged to move into abutting engagement with their associated contact screws 267 and 268 carried in insulating brackets 269 on side frame 217. The contact finger 263 is V-shaped at its extremity and engages a jockey roller 272 supported on the flat spring 273 fastened to the side frame 217 at 274.

Returning to a consideration of shaft 218 (Fig. 13) there is clamped to its left end gear sector 275 in mesh with a rack portion 276 on the edge of vertical flat blade or bail 277. The latter extends from near the bottom, as shown, to the top of the board, and is guided in a suitable manner by grooved rollers 278 pivoted on studs 279 fixed to the framework of the board. Edge of blade 277 opposite rack 276 is notched rectangularly at predetermined intervals throughout its height. Said notches 282 are in engagement with long rollers 283 pivotally carried on arms 284, each arm 284 being clamped to the extreme right end of one of rock shafts 285 which extend the whole width of the board. Rock shafts 285 in addition to being rotatively operable are slidable in an axial direction. There is a rock shaft 285 common to each row of dial-sets, as will be described hereinafter.

Referring to Figs. 13, 14, and 15 it is observed that each rock shaft 285 has affixed near its right end a sleeve member 286. Slidably engaging groove 287 in the periphery of sleeve 286 are the two circular heads of the arms of bifurcated member 288. Members 288 of which there are as many as there are rock shafts 285 are affixed to vertical shaft 289, suitably journaled in the board frame. At lower end of shaft 289 are fixed two ratchet sectors 292 and 293. Tension spring 294 (Fig. 14) urges upper sector 292 and its associated shaft 289 to its initial position against adjustable stop-screw 291 fixed in the framework. Upper sector 292 carries insulating bumper 295 which co-acts with the set of contacts 296 to close them when sector 292 is to the left in its extreme operated position to cause return of the parts to initial position as explained more fully hereinafter.

In operative relation with sectors 292 and 293 are ratchet pawl 297 and detent pawl 298 (Fig. 14) respectively, the former pivoted to swinging arm 299 and the latter to fixed arm 302. Solenoid 303 supported on the board base plate and to the left of shaft 289 is arranged with its plunger extension 304 pivotally connected at 305 to movable arm 299, a tension spring 306 serving to retract the solenoid plunger and its associated arm 299 and pawl 297 to normal when the solenoid is deenergized. Both pawls 297 and 298 are held in engagement with their respective sectors 292 and 293 by means of tension springs 307 attached to right extension 308 of the pawls 297 and 298 and to their respective arms 299 and 302.

Situated to the right of sectors 292 and 293 is reset magnet 309 suitably carried on the base. Armature 301 carries fixed pin 312 in operative relation with extensions 308 of pawls 297 and 298 in a manner similar to the relation of pin 134 and pawls 116 and 126 described previously in connection with the stock selector.

*Construction of a stock unit dial set*

Figure 22:
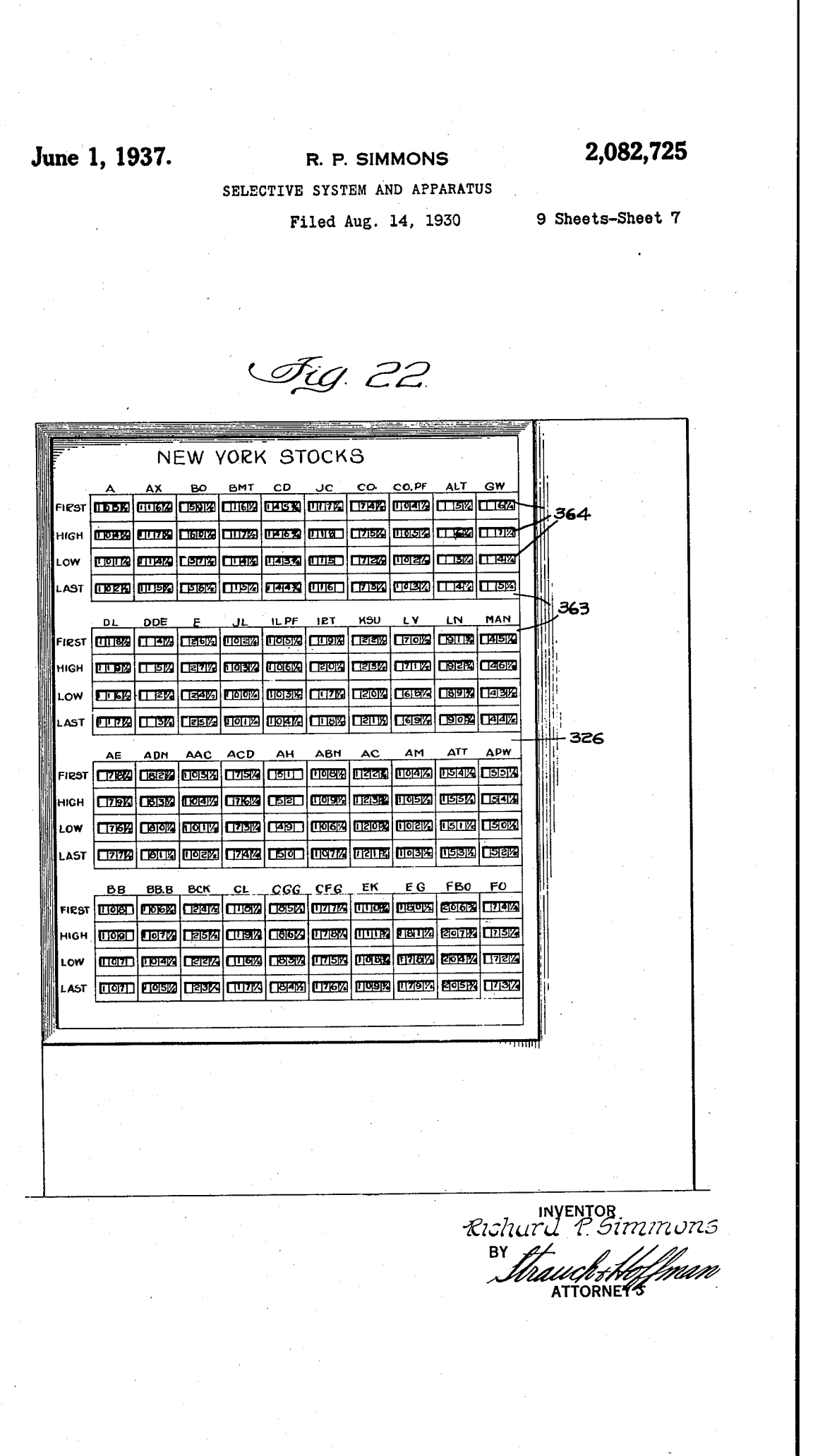

Referring to Figures 18, 19, 20, and 21 there is shown a set of dials for a complete price quotation and the mechanism therefor. This set contains the four numeral wheel dials to indicate the hundreds, tens, units and fractions of a price. The sets are arranged one above the other in proper relationship on the board as seen in Fig. 22, and may be grouped for example, four sets to a stock, thereby indicating the "first", "high", "low" and "last" quotations for a stock. In addition to being arranged one above the other in groups of four dial-sets each, the vertical array of groups may be multiplied so as to result in rows as well as columns of groups. Fig. 22, representing a front elevation of a typical board indicates more clearly such a desired arrangement. It will appear from what follows that the mechanism for operating these dial-sets is extremely flexible, and that the sets may be arranged in various desirable groups depending upon the stock or commodity to be quoted. For example, if a board is desired which will show "Futures" in grain, cotton, rubber, etc., the dial-sets may be arranged differently, as for instance the columns of sets may refer to "now", "opening", "high", "low" and "close" and the rows of sets may represent months, such a type of board being common in trading circles. The dial-sets are complete in themselves and may be removed from the board easily and quickly, if it is necessary to repair or replace a set, this feature becoming apparent in what follows.

As shown, the dial-set mechanism is carried in a frame casting comprising front 326 and two side portions 327 and 328. Side portions 327 and 328 terminate in inwardly turned lugs 329 and on each side frame in horizontal alignment with this lug 329 is a second lug 331. Both lugs 329 and 331 are drilled in line and each unit is supported by means of these holes upon two straight studs 332 to which it is appropriately secured and which studs are carried by board rear mounting frame 333, the unit being readily slid off or on these two studs for purposes of removal or replacement. A front mask 363, to be later described, serves to prevent the units from accidentally shifting from their proper location upon studs 332.

The complete set of dials and the individual operating mechanism therefor are mounted on the frame, and said operating mechanism is detachably associated with a common operating shaft, whereby any unit may be removed without interfering with or disconnecting from the common operating shaft.

At the lower right corner of Figure 20 may be seen rock shaft 285 previously referred to, and of which, it will be recalled, there is one common to each row of dial-sets. Affixed to rock shaft 285 and in a progressively spaced relationship to other parts of the set mechanism, as will appear, is a group of four fingers 334, which, in their normal position incline rearwardly. The extremity of each finger 334 terminates in a narrowed extension 335, the purpose of which is to properly engage its associated operable member.

Suitably guided in a comb 336 supported between left and right sides 327 and 328 of the frame and equally spaced with respect to each other are four push bars 337, notched at the extreme rear end, and from there forward the lower edge is provided with a concave arcuate contour, the purpose of which will be clear hereinafter. Each push bar 337 is pivotally connected at its front extremity to guide block 338, the upper end of which is rigidly fixed to dial rack 339, the lower end having a hole arranged to fit slidably over guide rod 341, the latter being rigidly carried by bar 342 supported by the sides 327 and 328 of the frame casting. In addition lower end of each block 338 terminates in lug 343 to which is attached one end of tension spring 344, these springs passing through clearance holes in bar 342 and attaching to lugs upon comb 336. Said springs 344 tend to urge the guide blocks 338 and attached racks 339 and push bars 337 rearwardly to their initial position.

Dial racks 339 are spaced near their forward end in a second comb 347 carried by sides 327 and 328 of the frame. The upper edge of the rear portion of each rack 339 is cut with ratchet teeth 348, the first tooth 349 being of larger proportions so as to form a stop. The rear portion of each rack 339 terminates in lug 351 to which is attached tension spring 352, also attached to lug 353 on its individual push bar 337, and intended to urge the push bars 337 in an upward direction and out of operative relation with fingers 334 with which they are associated. The upper edge of the front portion of rack 339 is cut with gear teeth 354 which are in mesh with pinion 355 affixed to each dial 356. Each pinion 355 and its rack 339 are held in operative close non-back-lashing relationship by means of rollers 357 pivotally carried on arms 358 affixed to shaft 359 journalled in side frames 327 and 328. Spring arm 361 integral with arm 358 is provided with tension spring 362 attached thereto, which serves to hold rollers 357 in engagement with their associated racks 339.

Each dial 356 is cylindrical in form and hollow and is preferably made of sheet aluminum or some other material having little mass and hence little inertia, which enables dials 356 to be operated from one position to another at a high rate of speed. Upon the periphery of each cylinder appear the numerals to be displayed, of a size sufficient to be readable at a suitable distance from the board, the numerals being spaced in appropriate fashion around the circumferential face of the dial. The first three dials from the left carry integers from 1 to 0 and a blank position, the last dial carries fractions from ⅛ to ⅞ and four blank positions. As will appear later all dials are returned to an initial, or blank position before display of a new quotation, and are stepped from initial to their new positions, so that the extra blanks on the "fractions" dial are immaterial.

Each group of dial-sets individual to a stock is provided with a thin flat mask member 363, large enough to cover the group and provided with rectangular apertures 364 through which the numerals on the dials are displayed. Mask 363 is attached to the board framework by screws (not shown) and as stated before the mask prevents the dial set units from moving out of position on their studs 332.

Carried by bracket 365 fixed to left side 327 of the frame is solenoid 366. Its plunger 367 cooperates with arm 368 affixed to bail shaft 369 by means of connecting link 371. Bail shaft 369 is suitably journalled in sides 327 and 328 of the frame and also has fixed thereto bail arms 372. Arms 372 extend forwardly, and at their inward turned extremities carry shoulder screws 373, upon which is shiftably mounted transverse bail blade 374. The latter is made shiftable longitudinally with respect to bail arms 372 by means of slotted holes 375 wherethrough shoulder screws 373 pass. Both bail arms 372 are provided with downwardly extending lugs 376 which carry fixed transverse bail rod 377 arranged to co-act with the four push bars 337.

Pivotally supported upon lug portions 378 on left side 327 of the frame is rocker member generally indicated 379 comprising a short vertical shaft 381, which carries rocker arms 382 and 383 affixed thereto and projecting in opposite directions as seen in Figs. 19 to 21. Lower rocker 382 is arranged to cooperate with the hundreds finger 334 by means of inclined cam surface 384 engaging extension 335 of finger 334. Upper rocker 383 is arranged to engage the left end of bail blade 374, only when this member is in its downward position as will be described. Adjustable backstop screw 385 and tension spring 386 serve to maintain rocker member 379 in its normal position, as shown.

Pivotally carried on transverse bar 387 fixed to sides 327 and 328 of the frame are four detent pawls 388. Rear arm 391 of each pawl 388 is arranged to be engaged by bail blade 374, when the latter is rocked counter-clockwise by magnet 366, as viewed in Fig. 20. Bail blade 374 is notched rectangularly at four points 389 (Fig. 18) in its lower edge and in such locations that when bail blade 374 is in its left position (Fig. 18) it may engage its associated feed pawls 388 by counter-clockwise movement about its pivot 369, but when shifted to the right, feed pawl arms 391 are allowed to enter notches 389 wherein they have enough room in which to oscillate when impelled by the teeth 348 of racks 339 in cooperation with their springs 393, and whereby they also prevent the return of bail blade 374. The front arm of each pawl 388 terminates in detent tooth 392 adapted to cooperate with teeth 348 of its dial rack 339. Tension springs 393 attached to the spring plate mounted on bar 387 and to arm 391 of pawls 388 urge the pawls in a counter-clockwise sense into engagement with teeth 348. Inasmuch as all of the members associated with a dial-set do little work and have small working pressures they may be very light in construction, resulting in a very low inertia and enabling the board to be operated at a high rate of speed.

*General operation of the system and apparatus*

Before describing the general operation of the system in detail a short account of the preliminary condition and of the method of synchronizing the sending and receiving stations will be given.

The quotation board system and apparatus disclosed herein usually operates on what is termed a fixed cycle for the stock symbol portion of the quotation. That is, three letters, or the equivalent in the form of one letter plus two substitute "zeros" or two letters plus one substitute "zero", must be transmitted for each individual quotation. The exception to this is when a "preferred" stock is to be quoted, in which case a fourth character "PF" precedes the other three letters of the stock symbol. In order to accommodate this symbol of extra length there is provided means in the system whereby a four letter symbol having "PF" for its first character does not become effective to step the stock selecting mechanism as does the usual three letter symbol, as will hereinafter appear.

In addition this system always operates on a fixed cycle for the price portion of a quotation, that is to say, four characters or digits must always be sent for a price; namely, a "hundreds", a "tens", a "units", and a "fractions" digit. Should it not be desirable or necessary to quote a numeral in the "hundreds", "tens" or "units" positions, a "blank" signal would be sent as a substitute therefor in order to make the full four character price quotation.

The complete quotation message may comprise, in addition to the three (or four) letter stock symbol and the four element price, an index character to control devices which determine whether the incoming price is to be quoted as "Today's open or first", "Today's high" or "Today's low". This additional index character is transmitted after the stock symbol and preceding the price, and is preferably included in the message only when the quotation is not to be a current or "last" price. This additional index character is ineffective to step the price indicating device as do the received numerals, but is directly effective to set up a specific control condition present only when the index is included and omitted when the quotation is to be a "last".

As will be later disclosed the completion of the stock or item selection at the receiving station automatically switches the receiving selector over to control the price indicating mechanism, and on the completion of the price indication the receiving selector is switched over to control the stock selector upon receipt of a clearance signal. These two switching functions correspond respectively to the "figures" and "letters" shift conditions of the apparatus, and the various devices must be in this interconnected relationship at the proper times during the reception of the message.

It is necessary that all receiving stations connected into the system receive the quotations in messages of fixed length for all stations, in order that the various devices may operate in the proper sequence and unison thereby maintained throughout the system. Should one or more receiving stations fall out of step due to some mechanical or electrical trouble, a wrong quotation may be posted or a wrong stock may be selected but the error will affect only one quotation. In addition there may be some fault at the transmitting station, either in the apparatus or an error on the operator's part in failing to fill out the symbol and price portions of the message to the requisite length.

It is necessary that a day's business be begun by the transmission of a "letter shift" or a "clearance" signal to insure that all receiving stations will have their respective stock selectors properly under the control of their respective receiving selectors, in order that all the stations may be in unison with the transmitting station.

Hence to synchronize all stations at the beginning of each group of signals representing a stock selection and a price selection, a "letter shift" or "clearance" signal is first sent and received to close its associated contact pair 12L (see Fig. 1). Thereupon a circuit is completed from positive of battery 431, over common conductor 432, a pair of contacts 12L, conductor 475, right coil of double coil relay 427, resistor 476 to negative of battery. The tongue 426 of the relay 427 is thereupon moved to the right or "letters" position. The purpose of the switching of the tongue 426 to this position is to remove the price indicating apparatus from the control of the receiving selector and to bring the stock selector under control of the receiving selector.

Upon reception of the "figure shift" signal, a similar switching function occurs and the tongue 426 is moved to the left or "figures" position, thus transferring the control of the receiving selector from the stock selector to the price indicating mechanism. The circuit is similar to that just traced for the "letter shift", and is obvious from an examination of Figure 1. A flat spring carrying detent roller 429 maintains the tongue 426 in either its right or left position when it is once operated thereto.

It will be assumed, for purposes of explanation, that the stock designated by symbol "B" is being quoted for a "last" of 45½, followed by a "high" quotation of 175¾ for stock "BB."

As hereinbefore stated the code combinations of impulses received from the dispatching station control a modified Kleinschmidt printer which acts to close pairs of contacts 12, one pair for each character code.

The letter "B" is first transmitted and received to close its contacts 12. Current then flows from positive of battery 431, over common conductor 432, contact pair 12, a conductor 433 through selector magnet B in the stock selector. Magnet B is one of the series of selecting magnets 22 of Figs. 2 and 8. Current then passes over common conductor 434, to operate both magnet B and relay 428 since negative has been already applied to this relay 428 by engagement of armature 426 with its "L" or letters contact. The stock selector mechanism operates as previously described in detail, the feelers 25 pushing three letter bars 63 forward and one stock bar 62 being then positioned to close its contacts 73 and 74. If the stock to be selected has but one or two letters, zero signals are received for the remaining of three signal intervals which signals correspondingly set the zero selector bars 43. For a better understanding of the zero bar function, it might well be considered as an additional or twenty-seventh character bar, since its effect is similar to that of an increase in alphabetical characters. As previously pointed out, the last movement of comb 26 of the stock selector closes contacts 35 and 36 to energize clutch trip magnet 163 to allow release of all stock bars, closing contacts 73 and 74 of the selected bar. After one-half revolution, shaft 59 of the stock selector is stopped, with selected contacts 73 and 74 closed thus energizing one stock solenoid 366. Thereupon (Figs. 18 to 21) plunger 367 is drawn within operated solenoid 366 and rocks its bail blade 374 in a counter-clockwise sense, by way of link 371, arm 368, bail shaft 369, and bail arms 372. Notches 389 in the lower edge of operated bail blade 374 are not over detent pawl extension 391 and therefore the unnotched portion of blade 374 becomes effective to rock detent pawls 388 clockwise to lift each tooth 392 from the notch 348 with which it had been previously engaged. Rack bars 339 now freely return to their initial position to the right of Figures 19 and 20 due to the action of springs 344, the racks 339 being stopped by the engagement of high tooth 349 with pawl tooth 392. In thus returning, racks 354 engaging their pinions 355 restore dials 356 of the selected group to initial or "blank" position.

The dials of the selected stock having thus been returned to "blank" for a new quotation, the operating mechanism for these dials must be associated with the figure operating or quotation mechanism for operation by signals to be now received, the remaining groups of dials being disassociated from this operating mechanism. When the bail shaft 377 was oscillated counter-clockwise as viewed in Figure 20, the push bars 337 associated therewith were pushed downwardly against tension of their springs 352 to position the ends of these push rods in the path of the fingers 334 in order that the dials of the selected stock may be operated. Since only one selected magnet 366 has been operated by the stock selector, as hereinbefore described, only one bail shaft 377 has oscillated and therefore only one set of push bars 337 have been depressed, all other push bars of the other stocks remaining in upward position out of the path of movement of the oscillating fingers 334.

In order to set up the quotation 45½ the transmitting signals must be comprised of a blank, followed by 45½, this being a fixed cycle system so far as the figures of the quotation are concerned, and four numerals or equivalents must be sent for each price quotation.

There are eleven selector magnets 201 corresponding to "blank" and 1, 2, 3, ... 0, and to ⅛, ¼, ⅜ ..., and there are eleven wires 440 connecting each magnet 201 to wires 433 of corresponding selecting magnets 22 for "blank" and 1, 2, 3, ... 0. The reception of "blank" closes the respective contacts on the receiving selector and a circuit is completed from positive of battery 431, common wire 432, closed pair of blank contacts 12, common conductor 433, wire 440, selector magnet 201, common conductor 449, coil of relay 451, conductor 452, to negative by way of tongue 426. Current cannot pass over common conductor 434 of magnet 22 since armature 426 is now in the "F" or figures position and this circuit is therefore open. Energization of the "blank" magnet 201 operates its armature 204 to push associated plunger pin 208 beyond plate 202. Upon energization of relay 451 its armature 453 is operated to complete a circuit from positive over tongue 453, closed contacts 454, conductor 455, upper or normally closed pair of contacts 267 and 265, coil of solenoid 225, to negative. Solenoid 225 operates to pull its plunger inwardly, and so rock shaft 218 to which it is linked, thereby rotating index arm 219 in clockwise direction as viewed in Figure 16 until arm 219 is blocked by the operated plunger pin 208.

This rocking movement of shaft 218 is communicated through gear sector 275 and its associated rack 276 to move blade 277 downwardly, thereby starting all rock shafts 285 and their associated fingers 334 in a counter-clockwise sense. The rock shafts 285 are so positioned that one shaft passes through each dial set (Fig. 19), the dial sets being arranged in horizontal rows as in Fig. 22, one rock shaft being provided for each such horizontal row, as indicated in Fig. 22. The normal axial position of the rock shafts 285 (as distinguished from their angular position) is as indicated in Fig. 19 which is their extreme upper limit of movement wherein the hundreds dial mechanism is in operative alignment. When in this position, shaft 285 is rotated, hundreds finger 334 engages bevel surface 384 of arm 382, thrusting bail blade 374 downwardly and against the action of its spring 380. This last action allows notches 389 in blade 374 to move into alignment with extensions 391 of the four detent pawls 388 and the latter are thereby free to rotate in a counter-clockwise sense aided by their springs 393 to re-engage pawl tooth 392 with the foremost of teeth 348 of rack bars 339. When fingers 334 oscillate as just described, all cam arms 382 are moved to thus reciprocate all bail blades 374. However, only one set of feed pawls 388 move when the notches in blade 374 align therewith, because but one magnet 366 is energized forcing its bail blade 374 against the tail ends of its latch pawls 388. Simultaneously, finger extension 335 of arm 334 is in operative relation with the notched extremity of the "hundreds" push bar such as 337 of the operated dial set, but the blocking of index arm 219 by "blank" pin does not allow finger 334 to move the push bar at all and the "hundreds" dial remains unmoved and indicates blank in the aperture 364 in front mask 363.

When solenoid 225 was operated, lower contact operating member extension 258 engaged contact member 262 to tilt arm 262 about pivot 259 to open upper contacts 265 and 267 and to close lower contacts 266 and 268, jockey roller 272 serving to maintain the last position of said contacts. Closing of contacts 266 and 268 (see Figure 1) completes a circuit from positive battery over said contacts, conductor 456, solenoid 303 to negative to operate plunger extension 304. This movement of plunger extension 304 becomes effective to feed ratchet sector 292 one tooth space, and shaft 289 an equivalent amount through the medium of feed pawl 297, detent pawl 298 retaining ratchet sector 293 and shaft 289 in its new position. The stepping of shaft 289 the equivalent of one tooth space is effective in axially shifting all the slidable rock shafts 285 far enough to carry the first or left finger 334 away from operative relation with its associated push bar 337 and to carry the second finger 334 into operative relation with its associated push bar 337, this shifting movement being communicated to rock shafts 285 through forked members 288 and sleeves 286. It will be noted at this time from Figure 21, that the push bars 337 are equally spaced, and their associated fingers 334 also, but fingers 334 are spaced upon closer centers, so that sequential stepping of shafts 285 upon feeding of ratchet sector 292 carries each of fingers 334 progressively into operative relation with its associated push bar 337, (see Fig. 21).

Opening of contacts 265 and 267 as previously set forth de-energizes solenoid 225 and allows plunger 229 and all its associated members, principally blade 277, fingers 334 and arm 219 to return to normal position by action of spring 300, (Fig. 13).

The numeral "4" is next transmitted and received on the selector magnet 4. Return of plunger 229 to normal has again closed contacts 265 and 267 and operation of solenoid 225 rocks fingers 334 as before. At this time, however, the "tens" finger 334 rocks to a position determined by the blocking of index arm 219 by plunger pin 208 associated with the "4" magnet, and push bars 337 having been pushed down by rod 377 on bail arms 372 are still in operative engagement with their individual fingers 334. Finger extension 335 of the "tens" dial thereupon engages the notched end of the "tens" push bar 337 and moves attached rack bar 339 the equivalent of four tooth spaces to rotate the "tens" dial 356 to display the numeral "4" in its individual aperture 364.

Subsequently, shaft 289 is rotated the equivalent of one tooth space, as before, and the third finger 334 is presented to its individual push bar 337, whereafter the figure "5" is received and displayed in the "units" aperture exactly as for the figure "4". The last numeral or "½" is also displayed in its aperture in the same manner. Thus the quotation reads for stock "B", in the "last" row "45½".

From the above description it will be clear that the extent of oscillation of arm 219 determines how far the selected dial is moved. With the figures arranged in consecutive sequence as "blank", 1, 2, 3, . . . 0 on the dials, and "blank, ⅛, ¼, ⅜, . . . ⅞, 0", it will be clear that the "blank" pin 208 will be so arranged as to allow substantially no movement of arm 219, and the numbers of higher order will allow increasingly greater movement thereof.

While push bars 337 individual to the selected dial-set are being operated finger extensions 335 associated with other unselected dial-sets oscillate freely under the push bars 337, the arcuate portion cut in the under side of these push bars allowing for the proper clearance.

After shaft 289 is stepped to a position to enable fractions finger 334 to set up the fraction "½" the next feed of plunger 304 by solenoid 303 causes bumper 295 (see Figs. 1 and 13) on ratchet sector 292 to close the contacts 296, thereby completing a circuit from positive, contact pair 296, over conductor 457, coil of magnet 309 to negative, to operate the armature 301 which (Fig. 14) by means of its fixed pin 312 lifts pawls 297 and 298 from engagement with their respective ratchet sectors 292 and 293 and spring 294 returns shaft 289 and rock shafts 285 to their initial positions.

Following the transmission of every complete quotation a "clearance" signal is sent, which acts to close related contacts 12 in the receiving selector to complete a circuit from positive of battery 431, conductor 432, closed "clearance" contacts 12, conductor 468, coil of relay 459, to negative to operate tongue 461. Whereupon a circuit is completed from positive, over tongue 461 and its front contact, over conductor 462, the now closed upper pair of contacts 463, conductors 464 and 439, clutch magnet 163 to trip the shaft 59, which rotates through its other half revolution in a manner similar to that described hereinbefore, thereby returning all stock bars 62 to their original positions, simultaneously opening the closed pair of "B" stock contacts 73 and 74 and returning the selector to initial position.

In addition to closing the circuit just described tongue 461 acts to supply positive current over conductor 465 to the right coil of relay 427 to operate tongue 426 to the right of "letter shift" position. This switching of the tongue 426 removes negative from the common conductor 443 of the code bar operated contacts 73 and 74 thereby deenergizing solenoid 366, and springs 352 urging the push bars 337 upward and out of operative relation with fingers 334 act upon bail rod 377 to rock bail blade 374 back to normal. In this manner subsequent operation of fingers 334 is ineffective upon push bars 337 of this particular dial-set and also all other dial-sets other than the one whose solenoid 366 is energized as hereinbefore set forth.

At the beginning of the description of the operation of this quotation board and system, there was assumed a quotation for a stock designated by the symbol "BB" of a new "high" of 175¾ the selection and setting up of which will now be explained.

In the selection of the stock "BB" the first "B" is exactly as recited above up to the point where the apparatus is in condition to send the second letter or equivalent. The second "B" is then sent instead of the second "zero" and the stock symbol is completed by a third "zero" to compensate for the lack of a letter in the third letter position. Should the stock symbol be represented by three letters as "BBB" no substitution of "zeros" would be necessary.

Following the stock symbol, a "high" signal would be transmitted, the effect of which would be to close "high" contacts 12 (see Fig. 1) on the receiving selector and a circuit would be completed from positive of battery 431 over common wire 432, closed pair of "high" contacts 12, a conductor 466, coil of "high" relay 467, conductor 468, "high" winding of relay 448, conductor 469, solenoid 366 of the "high" dial set of stock BB, conductor 444, closed pair of BB stock contacts 73 and 74, common wire 443, tongue 426 of relay 427 which is now in its "figure shift" position to negative. Thereupon the "high" relay 467 operates and locks itself up through its tongue 471, over conductor 472 to positive.

Before the "high" winding of relay 448 has had time to operate its tongue 447, the "last" solenoid 366 has operated through a circuit from positive, tongue 447, conductor 445, "last" solenoid 366, wire 444, closed contacts 73 and 74, conductor 443, contact 442, tongue 426 to negative. Subsequently the operation of tongue 447 of this relay acts to insert the shunt resistance 473 into the operating circuit of the "last" solenoid 366 and this solenoid remains held in its operated position by a lower value of current. The result of this is to allow the incoming quotation to be set up on both the "high" and "last" dial-set.

Subsequently to the preparation of the "high" set of dials for the display of the price, the figures 175¾ are transmitted and the dials set in the proper position, exactly as explained hereinbefore for the quotation "45½" except that the quotation is displayed simultaneously in both the "high" and "last" apertures.

It is obvious from the diagram of Figure 1 that an "open" or "low" quotation may be set up exactly as for the "high" quotation just described, the "last" being operated also.

The purpose of the balancing resistance 446 is to compensate for the resistance of the windings of relay 448 and relays such as 467 so that the circuits completed over conductors 445 and 469 may pass equal current.

Modified circuit for larger boards

Circuits of the type previously described in which a plurality of solenoids, such as 366, are selected individually in a coordinate manner, by means of one series of ordinate common wires over which one terminal of each solenoid common to an ordinate wire is multipled, the opposite terminal of each solenoid being multipled over one of a series of abscissal common wires; and arranged so that any common ordinate wire and any common abscissal wire may be connected as a pair to battery to select a particular solenoid, have the well known characteristic that leakage paths, in addition to those already described, are present. For this reason the circuit above described is adapted for use where only a limited number, say five or ten, solenoids are to be selectable. At the same time it has the advantage of needing only a small number of contacts. As the number of solenoids is increased a point is reached where the leakage current forms such a large percentage of the operating current that the operation becomes too marginal, and difficult to adjust.

Where more than a limited number of items are to be quoted the circuit shown in Fig. 23 is preferred, and necessary for commercial operation when the number of items becomes great. Instead of using a single conductor such as 444 common to the four solenoids 366 of each stock, each solenoid has connected thereto its individual conductor 501 terminating in a contact spring 502. The latter, four in number, are engaged by insulating ball member 503 which is adapted to be moved downward or upward respectively by upper and lower sets of stock bars 62, when these are operated as hereinbefore set forth. Each contact spring 502 is arranged to engage its associated contact spring 504. These latter are connected in multiple over the common wire 443, for connecting negative to each contact set as has been explained. By this means each single contact pair 73 and 74 is replaced with a group of four pairs of contact springs 502 and 504. In this way only that stock which is selected will have its solenoids 366 operated, all remaining solenoids having their return circuits broken at contact pairs 502 and 504, thereby eliminating all possible back feeding circuits for the following reasons.

In comparing the circuit of the dial boards of Figs. 1 and 23, it will be noted that when the "last" quotation for stock "B" is to be changed, the wire 444 leading to stock "B" and the wire 445 corresponding to the "last" quotation are connected to battery. It will be seen that current can therefore flow from wire 444 through the "B" stock magnet 366 to the "last" wire 445 direct. However, some current can flow over the "B" stock magnet 366 corresponding to the "low", into the "low" solenoid 366 or any other stock, for example, stock "BB" then downwardly into the "last" magnet 366 for stock "BB", and into "last" wire 445. From an examination of this figure it will be apparent that such leakage currents must pass through at least three solenoids 366 and therefore will not be of sufficient strength to operate them. The main portion of the current will therefore pass through the single solenoid, corresponding to the desired quotation.

However, in the system of Figure 23, it will be seen that current for the "last" quotation of stock "BB", for example, may flow through its individual wire 501, through the "last" solenoid 366 of stock "B", to the "last" wire 445. Each of the three other wires leading to the solenoid of stock "B" is connected to the source of energy by the "B" stock bar 62 and the circuit closing segment 503, but leakage current cannot flow through the "high", "low", or "open" "B" solenoids 366, since none of the other stocks such as stock BB, are connected directly to the last wire 445. With the connections of Fig. 23, therefore, it will be seen that leakage currents by other paths are eliminated and the number of stocks which may be quoted is unlimited as far as leakage currents are concerned.

The stock selector described in connection with the preferred embodiment of this invention is arranged so that the user of a stock board installation may obtain quotations on his board for any specified number of stocks as limited by the number of stock bars 62 on the stock selector. In addition he may, by so setting the adjustable dogs 76 on the stock bars, have available a chosen group of all the stocks which are being quoted from the central transmitting station. It is understood that all stocks which are quoted affect the letter bars 43 of every stock selector connected into the system. At each stock selector only that stock bar 62 responds which has its dogs set for the particular stock symbol sent, all other stock symbol combinations being disregarded as far as that station is concerned.

If a broker should wish to change any dial-set group on his board to a new stock, he needs but readjust dogs 76 on stock bar 62 individual to that dial-set group to allow that same stock bar 62 to be operated upon the reception of some different stock symbol code.

Method of posting of "preferred" stocks

Means have been provided in the system disclosed for the handling of "preferred" stocks. The stock symbol for such a stock shall be preceded by a character "PF", and this is equivalent to the addition of a fourth character to the normal three letter symbol.

Accordingly, there is provided a special "PF" selector magnet such as 22 on the stock selector. This magnet 22 is provided with feeler 510 similar to the others but different only in the addition of lug 511, Fig. 7. Pivotally carried upon support 512 integral with comb 26 is latch member 513, arranged to engage lug 511, when the latter is carried downward by feeler 510. Tension spring 514 preserves this engagement once it has taken place. In operative relation with lower extension 515 of latch 513 is stop 516, the purpose of which is to disengage latch 513, when comb 26 is moved to its final or left position. An additional letter bar 43 is provided to be operated by feeler 510.

The operation will now be described (see Fig. 1). When a "preferred" stock is to be quoted a "PF" signal is first transmitted and received upon the receiving selector. Pair of "PF" contacts 12 are closed to operate selector magnet "PF" on the stock selector and feeler 510 is operated downward as already detailed. In this instance shaft release magnet 106 is not energized as an examination of the circuit will show, since the "PF" magnet is not connected to common conductor 434 but has a separate conductor 402 which is not connected to magnet 428. Lug 511 on feeler 510 engages latch 513, Fig. 7, and the feeler is held in this position. Thereafter, upon selection of the letter bar 43 for the first actual letter of the stock symbol, the "PF" letter bar 43 is also pushed over at the same time. By selecting a fourth letter bar 43 only those stock bars 62 having a fourth dog 76 properly set for this bar will be operable. Upon the completion of the stock selection and when comb 26 is shifted to its final selecting position, stop 516 engages latch extension 515, latch 513 is rocked counterclockwise and "PF" feeler 510 is allowed to return to its initial position, being so urged by retractile spring 40 on its armature 24.

There is also added in this modification an extra or fourth dog 76 on all stock bars 62 individual to the "PF" stocks on the board, and arranged to selectively engage the "PF" letter bar 43 as do dogs 76 previously described.

It is quite generally found that a "preferred" stock which is being dispatched, would have a related "common" stock also being dispatched; for example, "X" and "X preferred". When such is the case an additional fourth dog would be provided on the stock bar individual to the "common" stock to prevent the "common" stock bar contacts 73 and 74 from closing at the same time as the "preferred" stock contacts are being closed. Such a dog 517 on the "common" stock bar would be slightly different from the three other dogs 76 on the same stock bar, in that its lug 518 (see Fig. 6) would be offset in a direction transversely of stock bar 62 instead of being located in the center of the dog. The explanation is clear from an examination of Fig. 6. There it will be seen that when the "PF" letter bar 43 is unoperated the "common" stock bar solely can close its contacts 73 and 74 since a notch 21 appears in the "PF" letter bar 43 underneath the offset lug 518 on the fourth dog 517 carried by the "common" stock bar enabling this lug 518 to enter the notch 21 whereas the lug 77 on the fourth dog 76 carried by the "PF" stock bar finds a lug 20 on the "PF" letter bar below it and for that reason the "preferred" stock bar cannot close its related contacts 73 and 74. In the same figure the letter bar 43 is shown in its operated position by dotted lines, and the conditions of the inoperated position are reversed.

It is thus seen that the "preferred" letter bar allows either the "common" or "preferred" stock bar to move, dependent upon its position, but both "preferred" and "common" stock bars of the same stock can never be simultaneously moved. It will be obvious from the figure that the "preferred" stock bar may operate and the "common" may not. It will also be obvious that additional bars may be added for 2nd preferred or other types of stocks.

*Board for specialists*

There is a demand by executives for a quotation board which will show only current quotations, meaning all quotations other than "today's opening", "today's high", "today's low", and "yesterday's close"; and for a board which will be, in addition, readily and rapidly interchangeable. That is to say, the user should be able to select a group of stocks different from the group in which he is directly interested at the time, and be able to do so instantly in accordance with his needs and desires.

In small boards, displaying but five or ten stocks, the user may desire more frequently to change to a new stock than in large boards where all stocks of interest may be shown at all times. Such small boards may be simple, showing "last" or current quotations only; and in such boards the rapid and flexible interchangeability of stocks as just stated becomes highly desirable.

For such a board the circuit arrangement Fig. 1 for solenoid selection is followed somewhat, but the leakage currents are negligible since only a small number of items are desired. On the other hand the advantage of only a small number of contacts is readily available; and is appreciable due to the fact that a simple operating arrangement is a primary consideration. It will be understood, however, that the wiring of Fig. 23 may also be applied to this type of board.

To achieve this result there is provided, instead of the stock selector previously described, a bank of jacks connected together with the operating solenoids 366 of the dial sets; a shelf of relays of a predetermined number, each relay connected through a standard four-conductor telephone cord to an individual four point plug; and a bank of polarized relays. The jacks and plugs are arranged in some convenient manner similarly to a standard telephone switchboard, see Fig. 24.

As shown in the diagram of Fig. 25, which represents the circuit for this modified arrangement, there are three groups: I, II and III of jacks 526, arranged in rows and columns, the number of these rows being the same as the number of stocks which it is desired to have quoted. The first group I of jacks consists of twenty-six columns which may be known as the A to Z first letter group; the second group II and the third group III of jacks each consists of twenty-seven columns each and may be known as the A to Zero second letter group and the A to Zero third letter group respectively. These jacks are all mounted in standard fashion upon a switchboard panel, Fig. 24 and the columns are headed: A to Z for the first group, A to zero for the second group and A to zero for the third group, as shown.

Carried on a shelf 527 in the cabinet below the switchboard are a number of relays 528, the total being three times the number of stocks it is desired to have; for example, if there are to be ten stocks there will be thirty relays 528. Each relay 528 is provided with one pair of make contacts 529. The four conductors, two for the relay winding and two for the contact pair 529, are formed into a cord 531 which terminates in a telephone plug 532 disposed in standard fashion at the front of the switchboard as shown. Cord weights (not shown) are provided to facilitate handling of the plugs.

For purposes of illustration each of the horizontal rows of jacks may be numbered from 1 to 10, if there are ten stock dial-sets on the board. Now, if it is assumed, for example, that a user desires to have quotations on the stocks designated by the following symbols displayed by the respective dial-sets, thus:

| BBA | ABB | BB | B |
|---|---|---|---|
| Set #2 | Set #5 | Set #6 | Set #10 | the switching of the dial-set circuits is effected by inserting any 12 plugs in the following 12 jacks:

| Stock | Dial set | Section | Row | Jack |
|---|---|---|---|---|
| BBA | 2 | I | 2 | B |
|  |  | II | 2 | B |
|  |  | III | 2 | A |
| ABB | 5 | I | 5 | A |
|  |  | II | 5 | B |
|  |  | III | 5 | B |
| BB | 6 | I | 6 | B |
|  |  | II | 6 | B |
|  |  | III | 6 | Zero |
| B | 10 | I | 10 | B |
|  |  | II | 10 | Zero |
|  |  | III | 10 | Zero |

It will be evident from what will follow that first, the letters comprising a stock symbol may be in any order, such as ABC, BAC, CAB, etc. and second, in the case of stock symbols comprised of only one or two letters "zeros" are substituted for the blank spaces as is clear from the preceding table, the reason being the same as given hereinbefore; namely, that the stock symbol must be sent as a code of fixed length.

The operation of the modified form of this invention will now be described. Each pull bar 9 of the modified Kleinschmidt printer, instead of closing a single pair of contacts acts to close two pairs of contacts such as 533, 534 and 533a, 534a for letters, figures and fractions, and each pull bar for "clearance", "figure shift" and "letter shift" acts to close one pair of contacts 535.

As an illustration the reception and posting of a quotation BBA 138⅞ will be detailed.

To begin with, a "letter shift" signal is transmitted and received to close a pair of contacts 535, whereupon a circuit may be traced from ground over contact pair 535, conductor 536, left winding of double coil relay 537 to positive, to operate tongue 538 to close its left contact. A circuit is then completed from positive battery, tongue 538, conductor 539, tongue 542 of relay 550, contact finger 543, contact stud 544 to impress positive polarity on common conductor 545 of group I. Subsequently letter B is received and B pair of contacts 533 and 534 are closed by its pull bar 9, completing a path from ground, over contact 534, contact 533, conductor 546, to left winding 547 of polar relay 548 of group I, to positive over previously prepared conductor 545. There is an individual polar relay 548 for each vertical column of letters and for zeros, as seen in Fig. 25. Upon energization of left coil of relay 548 of B column, group I, its associated tongue 549 closes circuit from positive, through its contact 552, over conductor 553 to lowest contact springs 554 of the column of jacks headed "B" in the section I, the circuit thus prepared remaining so due to polar action of relay 548. As already explained a relay 528 is plugged in on the horizontal row corresponding to the location of stock "BBA" on the board and in column "B". A circuit is completed over spring 554, coil of relay 528, upper contact spring 555, to ground, to energize relay 528 which operates to close its contact points 529 to complete the circuit which was initially opened at contact springs 556 and 557 by insertion of plug 532. Simultaneously with the operation of relay 528 all other relays, whose plugs were inserted, if any, in this column B of group I also operated in identical fashion.

After a time interval sufficient to allow polar relay 548 to operate, the second pair of contacts 533a and 534a are closed by their related pull bar 9, (this time delay between the subsequent closing of contact pairs 533, 534, and 533a, 534a being obtained by the proper mechanical spacing of the contacts) and a circuit is completed from ground, over contact pair 534a and 533a, common conductor 558 to relay 550 to positive. Relay 550 operates its tongue 542 to break circuit over common conductor 539 and immediately after this, armature 559 of relay 550 is operated to step, through its feed pawl 562, the ratchet sector 563 one tooth space, thereby moving contact finger 543 into contact with second contact 564. Detent pawl 565 engaging a second toothed portion 566 of sector 563 acts to retain sector 563 and its related contact finger 543 in their operated position.

By this time the pull bar 9 has completed its contact closing stroke and has returned to its initial position. Hence current is taken off the relay 550 by disengagement of contacts 533a and 534a and polar relays 548 by disengagement of contacts 533 and 534. The former allows its tongue 542 to again close the circuit of which it is a part to apply positive battery to conductor 567 of group II in preparation for the second letter of the stock symbol; and also allows its armature 559 to return to its initial position.

The purpose of breaking the circuit furnishing positive battery to common wires 545, 567, and 568 by means of the relay tongue 542 is to prevent the pulse stored in contacts 533 of section I to set a relay in section II after contact finger 543 has been switched from its contact stud 544 to its contact stud 564. The latter connects positive by means of the common wire 567 to the left windings 547 of all the polar relays of section II connected letter for letter through the contact pairs 533 to ground. Hence it is important to break the positive lead as just described.

Following reception of the first letter "B" and its storage in polar relay 548 with the consequent operation of relay 550, all as set forth previously, the second letter "B" is received and polar relay 548 individual to "B" column of the second group II is operated to affect a second relay 528 in the same horizontal row as the first operated relay 528. The circuit for this is obvious and is quite analogous to that for the first letter "B", except that the section II common wire 567 is now energized over the contact stud 564, in order to operate only the relays in section II. Directly after the setting of second polar relay 548, sector 563 is stepped another space to prepare the common wire 568 for the setting up of a relay in section III.

Subsequently the letter "A" is received and a third polar relay 548 in "A" column, section III is set, analogously to the first and second letters, the circuit being obvious from the figure.

From an examination of any horizontal row of jacks 526 it will be noted that in the complete absence of plugged relays 528 from any row, a circuit will always be completed from ground at 569 over the jack contact springs 556 and 557 and their connecting wires to the dial-set solenoid 366 to positive. As a result this solenoid will always be held in its operated position, an absolutely undesirable condition. Should there be a relay 520 omitted in the same row in one or in two sections it is evident that the circuit through the jacks in that section or sections will always be closed, and accordingly, it would make no difference as far as the selected solenoid is concerned what letters were received for that section or sections, the solenoid 366 would operate just the same.

From this reasoning it is clear that at least three relays 528 must be plugged in for each stock and unless these three relays are all selected and operated the related stock solenoid will always be energized and therefore the dials thereof will be at "blank", since energization of a relay 366 first returns its dials to zero or blank, as previously explained.

Therefore, to receive quotations on any stock its three jack plugs must be inserted on the horizontal row thereof, thus opening the circuit of its solenoid 366 at three points. These three open points are then successively closed by reception of the three letters of the stock.

If, for some reason, it is desired to incapacitate a stock dial-set completely, this may be done by inserting a plain plug, having no connections thereto, in any jack in the row of jacks individual to the stock in question. The function of this jack is to open the series circuit through all the jacks in the row by opening the circuit at one pair of contacts, such as 556 and 557.

It has been seen that signals were received in the order BBA and the three associated relays 528 were operated, their contacts 529 completing the circuit which was broken by insertion of the plugs from ground at 569 to positive to operate the solenoid of stock BBA, and prepare the dial-set mechanism for the indication of a new quotation by returning the dials thereof to blank.

The reception of the last letter steps the ratchet sector 563 one step. This last step causes bumper 572 on sector 563 to close contacts 573, whereupon a circuit is completed from ground, over contacts 573, conductor 574, right winding of relay 537 to positive, to operate tongue 538 to the right. This switching function closes a circuit from positive, over tongue 538, conductor 560 to prepare a return common wire for numeral selecting magnets 201 and relay coil 451, the latter two units being the same as previously described. This last step of sector 563 furthermore moves contact arm 543 to a blank contact 564, thus disconnecting conductors 545, 567 and 568.

It will be observed from Figure 25 that conductor 574 has an upward branch terminating at contact pair 535 of "figures shift" bar. This is provided so that the apparatus at the board stations may be shifted to the "figures" position by a special "figure shift" signal, the circuit being from ground over pull bar operated contacts 535, over the conductor 574 to the right winding of relay 537 to positive, as before.

Following the preparation of the "figures" magnet return circuit, the figures are received on the Kleinschmidt type selector and the pull bars close pairs of contacts such as 533 and 534 and circuits are closed successively from ground over contact pairs such as 533 and 534, over conductors such as 575, selecting magnets 201, relay winding 451 to positive over common conductor 560, the figure selection and posting being exactly as previously described. Closing of contacts 533 and 534 by the "figures" quotation has no effect upon the previously set polar magnets 548 since the common return wires 545, 567 and 568 are all open at contacts 544 and 564.

Even though the contact pairs such as 533a and 534a close upon the reception of each figure, nevertheless the energization of relay 550 thereby does nothing except to actuate tongue 542, and attempt at the same time to feed the ratchet sector 563. The first is ineffective since the contact arm 543 now engages blank contact 564 as just explained, and the second does nothing because there are no teeth cut upon the ratchet with which the feed pawl may engage.

The solenoid 366 of stock BBA being energized and held in set position by the closing of its series circuit from 569 through the jacks and plugs as above described, the four figures for the stock quotation are received. The reception of the four figures corresponding to the quotation of the stock operate the selecting magnets 201, in a manner hereinbefore described in detail, to step the four dials of the selected stock to the new positions thereof, corresponding to the quotation. In the examples given, the dials of stock BBA will be stepped to 138⅞. As has been previously described, the operation of the figure setting mechanism for the dials is effective only upon the dials whose solenoid 366 is energized to hold the push bars 337 downwardly into the path of movement of the oscillating fingers 334. As each finger is moved, the fingers 334 advance the dials of the operated solenoid 366 to register thereon the new quotation, in this instance, 138⅞.

Since the circuits disclosed in Fig. 25 operate upon the theory that three plugs will be inserted respectively in Groups I, II, and III, in order to have the stock quoted by the incoming signals, it is obvious that a stock designated by one letter will have the plug corresponding to that letter inserted in Group I, and jacks in the zero columns of Groups II and III, as seen for stock B in Fig. 25.

Once a quotation on a stock is received and the clearance signal which follows each quotation has been received to restore the mechanism as hereinafter described in detail, the quotation of this stock will remain on the board until a subsequent quotation is received, or until the jacks are removed from the board. When a subsequent quotation is received for any previously quoted stock, obviously the mechanism will function as above described to close the circuit through the jacks to the solenoid 366 to return the same to zero, and then the subsequent quotation will appear on the dials thereof.

Upon the completion of the setting of the four figure dials to the price 138⅞ a "clearance" signal is sent. Thereupon "clearance" contacts 535 are closed completing a circuit from ground, over said contacts 535, conductor 576, relay coil 577, common wire 578 to the right windings 579 of all the polar relays 548 to positive, thereby switching all the operated tongues 549 back to the right, removing positive from operated relays 528, which in turn break their contacts 529 to break the circuit of operated solenoid 366.

Energization of relay 577 attracts its armatures 582 and 583, which, by their engagement with extensions on feed pawl 562 and detent pawl 565 respectively, withdraw the latter from engagement with their related sectors 563 and 566 and allow these sectors and their associated arm under influence of their springs 584 to return to normal against a fixed stop 585. In this way the "clearance" signal prepares the apparatus for the reception of a succeeding quotation.

Although there has been disclosed and described a system comprising a central station and only one remote or controlled station it will be understood from an examination of Fig. 1 that the line 3 may extend over branch lines to a multiplicity of remote stations such as the one just described or the one shown in Fig. 25. It is obvious from the foregoing description that the same type of signals become effective at a remote station of either type. Therefore one or more stations such as in Fig. 25, may be connected into the transmission circuit with the complete dial boards as in Figs. 13 to 20, the reception of quotations of stocks not plugged in on the boards of Fig. 25 being ineffective.

It will thus be seen that the board of Fig. 25 is adapted to give the last quotation for a selected group of stocks. Figs. 24 and 25 have been described as having ten horizontal rows of plugs for the reception of jacks, thus allowing the board to give quotations for ten stocks. It will be clear that this number could be varied and more stocks could be quoted, within practical limits.

From the descriptions of Figs. 24 and 25 it will be at once apparent that the user of this type of board may selectively use the plugs and jacks to receive quotations from any selected group of ten stocks which is desirable. Since the communicating line with which this board is connected is constantly receiving quotations for all of the various stocks, it will be clear that the user thereof may selectively plug in for any stock quotation desired and the next received quotation of the selected stock will at once energize the circuits as above described to change the dials to give the last quotation of the selected stock.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim and desire to secure by Letters Patent is:—

1. In an automatic quotation board, a plurality of indicator dials combinedly representative of a single legend, operating mechanism carrying arms individual to each of said dials, means for shifting the operating mechanism from dial to dial successively for thereby alining each of said arms with its dial, and further means for operating the dials successively upon repeated successive operations of said mechanism.

2. In an indicator system, a plurality of groups of indicating elements, each element adapted to assume a plurality of positions, common operating means for all said elements, a magnet individual to each group to associate the indicating elements thereof to said common operating means, means to operate said common operating means, a plurality of stops selectively operated to limit movement of said operating means, and a selector mechanism responsive to permutation code signals for selecting one of said stops and interposing it to effect a selective operation of said common operating means.

3. The invention as defined in claim 2 wherein said stops are equal in number to the positions assumable by said indicating elements.

4. In an indicator system, a plurality of indicating elements, each element adapted to be set in a plurality of positions, common operating means for said elements, means to successively connect said operating means to said elements in sequence, and selectively operated stop means for limiting the extent of movement of said operating means to thereby set said indicating elements.

5. The invention as defined in claim 4 wherein said selectively operated stop means includes a plurality of electromagnets for actuating said stop means.

6. In an indicating device, a plurality of indicating elements, means individual to each element tending to return said element to normal, pawl and ratchet teeth associated with each element and adapted to hold said element in any selected position, means to simultaneously release all the pawls to permit all the elements to return to normal, means to reengage the pawls to the ratchet teeth after the elements have returned to normal, element setting control means comprising rack bar and pinion engagement means, and means to consecutively connect the element setting control means to the elements to successively set the elements by moving said rack bar means through various degrees.

7. In an indicating device, a plurality of indicating dials, an individual operating bar for each dial, means biasing each dial to initial position, pawls normally engaged with said operating bars for maintaining said dials in set positions, an oscillatory bail for simultaneously disengaging said pawls from said bars, and means for moving said bail transversely to allow re-engagement of said pawls with said bars.

8. The invention as defined in claim 7 wherein each dial has a push bar operatively connected thereto, and fingers for operating said push bars, oscillatory movement of said bail positioning said push bars into operative relation with said fingers.

9. In combination, a plurality of sets of indicators, selector bars, each having a construction individual to one of said indicators, means responsive to code combinations of impulses individual to an indicator whereby one of said selector bars is operated, and means whereby said selector bar may be replaced by any other selector bar individual to another indicator for operating said other indicator in response to code signals individual thereto.

10. In a telegraph system, a series of indicators to be successively set, means to transmit a corresponding series of signals each pertaining to one of said indicators, a single setting device longitudinally movable to register opposite each indicator, local means for advancing said device to each indicator automatically after its setting of a previous indicator, and a mechanism under control of said series of signals for correspondingly varying the degree of movement of said device with respect to each indicator.

11. In an indicating device, a set of integer indicating dials each capable of movement to display any of several integers, an operating arm associated with each dial, a common shaft for supporting the several arms of each indicator, means for moving said shaft longitudinally for associating each arm with its particular dial individually, and means for oscillating said shaft for thereby moving a dial with which its arm is in associative relation.

12. In an indicating device, a set of dials longitudinally supported in spaced relative alinement, a set of dial operating arms, a shaft upon which said arms are supported in spaced relative alinement differing from that of said dials, means under control of electric signals for imparting an operating motion to said arms which varies in degree in accordance with the character of the signals, and means for imparting an alining motion to said shaft for bringing successive ones of said arms into registration with its dial individually.

13. The combination set forth in claim 12 in which said last mentioned means is automatically responsive to a preceding operation of said first mentioned means.

14. In an indicator system, a plurality of groups of indicator dials each indicator being capable of assuming several positions and the indicators of each group cooperating to represent a single item of information, an operating mechanism including a portion associated with each of said groups, a translating mechanism responsive to signal control for imparting a certain movement to said mechanism in accordance with a particular signal, means under the control of certain signals for rendering each portion of said mechanism effective upon its group of indicators, and operating arms associated with each portion individual to each indicator.

15. In an indicator system, a plurality of groups of indicators, an operating mechanism having a member associated with each indicator of a group, means under the control of certain signals for conditioning a group of indicators for operation, means under the control of other signals for setting said mechanism predeterminedly, and spontaneously operative means for associating each of said members of a group with its indicator successively.

16. In a stock quotation system, a receiving station including a selector mechanism responsive to both selecting and indicating signals, a plurality of indicators each comprising a set of digit dials, means responsive to the selecting signals for conditioning an indicator to be controlled by said indicating signals, a dial operating mechanism common to said plurality of indicators and responsive to each indicating signal for setting the dials of a conditioned indicator, and means automatically responsive to each operation of said dial operating mechanism for associating another dial into operative relation with said mechanism successively.

RICHARD P. SIMMONS.